(12) United States Patent
Marin et al.

(10) Patent No.: US 12,091,513 B2
(45) Date of Patent: Sep. 17, 2024

(54) CENTRIFUGAL PROCESS FOR THE CONTINUOUS MANUFACTURE OF NOVEL UNCROSSLINKED POLYSILAZANES

(71) Applicants: Lucas Marin, Central Point, OR (US); Alexander Lukacs, III, Ashland, OR (US); Michael Leimas, Central Point, OR (US)

(72) Inventors: Lucas Marin, Central Point, OR (US); Alexander Lukacs, III, Ashland, OR (US); Michael Leimas, Central Point, OR (US)

( * ) Notice: Subject to any disclaimer, the term of this patent is extended or adjusted under 35 U.S.C. 154(b) by 0 days.

(21) Appl. No.: 18/387,800

(22) Filed: Nov. 7, 2023

(65) Prior Publication Data

US 2024/0191037 A1 Jun. 13, 2024

Related U.S. Application Data

(60) Provisional application No. 63/432,075, filed on Dec. 13, 2022.

(51) Int. Cl.
*C08G 77/62* (2006.01)
*B01D 17/02* (2006.01)
*C01B 21/087* (2006.01)

(52) U.S. Cl.
CPC ......... *C08G 77/62* (2013.01); *B01D 17/0217* (2013.01); *C01B 21/087* (2013.01)

(58) Field of Classification Search
CPC ........................ C08G 77/62; B01D 17/0217
See application file for complete search history.

(56) References Cited

U.S. PATENT DOCUMENTS

| | | | |
|---|---|---|---|
| 2,541,725 A | 8/1949 | Stowe | |
| 4,255,549 A | 3/1981 | Christophliemk | |
| 4,397,828 A | 8/1983 | Seyferth | |
| 4,482,669 A | 11/1984 | Seyferth | |
| 4,840,778 A | 6/1989 | Arai | |
| 6,329,487 B1 | 12/2001 | Abel | |
| 7,033,562 B2 | 4/2006 | Knasiak | |
| 7,897,129 B2 | 3/2011 | Autrey | |
| 2010/0210808 A1 | 8/2010 | Jeong | |

FOREIGN PATENT DOCUMENTS

| | | |
|---|---|---|
| JP | 59207812 | 11/1984 |
| JP | 60145903 | 8/1985 |
| JP | 63290429 | 11/1988 |

OTHER PUBLICATIONS

A. Stock and K. Somieski: Siliciumwassertoffe, X.: Stickstoffhaltige Verbindungen, Ber. Dtsch. Chem. Ges. 1921, vol. 54, Issue 4, pp. 740-758.
D. Seyferth, G.H. Wiseman, and C. Prud'homme, "Liquid Silazane Precursor to Silicon Nitride", Communications of the American Ceramic Society, Jan. 1983, 66, pp. C-13-C-14.
Dolphin Centrifuge, Can a centrifuge separate salt from water?, https://dolphincentrifuge.com/can-a-centrifuge-separate-salt-from-water/, 2023.
M. Arai, S. Sakurada, T. Isoda, and T. Tomizama, "Preceramic Polysilazane Precursors to Silicon-Nitride", Polymer Preprints, 1987, 28, pp. 407-408.
S.D. Brewer and C.P. Haber, "Alkylsilazanes and Some Related Compounds", Research Laboratory, General Electric, 1948, vol. 70, pp. 3888-3891.
C.R. Kruger and E.G. Rochow, "Polyorganosilazanes", J. Polymer Sci. Part A, vol. 2, 1964, pp. 3179-3189.
Y. Tsori and L. Leibler, "Phase-separation of Miscible Liquids in a Centrifuge", C.R. Physique, vol. 8, 2007 pp. 955-960.
G. Redl, "Silazane Polymers", Harvard University, ARPA Contract SD-88, Oct. 1965.
D. Ya. Zhinkin et al. "Ammonolysis and Aminolysis Reactions of Dichlorodimethylsilane" Khimiya Geterotsiklicheskikh Soedinenii, vol. 2, No. 5, 1966, pp. 791-795.

*Primary Examiner* — Marc S Zimmer
(74) *Attorney, Agent, or Firm* — Mohr Intellectual Propery Solutions, PC

(57) ABSTRACT

A rapid, centrifugal method to prepare polysilazanes and separate them from their ammonium halide-anhydrous, liquid ammonia by-product is coupled with several, alternative methods to recover ammonium halide and anhydrous, liquid ammonia from the by-product. Some reactive modes of by-product recovery lead to sodium chloride as the sole waste product of, optionally, to ammonia borane as a secondary product of the process.

15 Claims, 8 Drawing Sheets

CENTRIFUGAL PROCESS FOR THE CONTINUOUS MANUFACTURE OF NOVEL UNCROSSLINKED POLYSILAZANES

CROSS REFERENCE TO RELATED APPLICATIONS

This application claims priority to U.S. Application, Ser. No. 63/432,075, filed on Dec. 13, 2022, which is hereby incorporated by reference for all purposes.

BACKGROUND

This invention relates to the preparation of polysilazanes. Additionally, this application contains numerous citations to literature and patents. All citations are incorporated herein by reference for all purposes unless stated otherwise.

Polysilazanes of various compositions have been used to prepare silicon nitride and silicon carbide-containing ceramics, and are typically prepared by the ammonolysis or aminolysis of dihalosilanes, sometimes inclusive of minor amounts of trihalosilanes and/or tetrahalosilanes. For this reason, the prior art discussed below focuses on the preparation of polysilazanes from dihalosilanes.

It should be understood that the Polysilazanes used for the preparation of ceramics having high silicon nitride content are commonly called "inorganic" polysilazanes and, for the most part, have been prepared from monomers where every silicon atom is bonded to two hydrogen atoms.

A. Stock first demonstrated such an "inorganic" polysilazane, having the formula —$[SiH_2NH]_n$—, by reacting dichlorosilane with ammonia using benzene as a solvent [A. Stock and K. Somieski, "Siliciumwasserstoffe, X.: Stickstoffhaltige Verbindungen", Ber. Dtsch. Chem. Ges. 1921, Vol. 54, Issue 4, 740-758]. This inorganic polysilazane was found to be an oligomer (n=7 to 8) comprising cyclic polysilazanes as the major product (X %) and small amounts of low molecular weight, linear oligomers (Y %). It is a viscous liquid at room temperature D. Seyferth et al found that the procedure pioneered by Stock and Somieski gave a much better yield of higher molecular weight ammonolysis products when it was carried out in more polar solvents such as dichloromethane or diethyl ether [(a) D. Seyferth, G. H. Wiseman, and C. Prud'Homme, "Liquid Silazane Precursor to Silicon Nitride", J. Amer. Ceram. Soc. 1983, 66, C-13-C-14; (b) D. Seyferth, C. C. Prod'Homme, and G. H. Wiseman, "Stable Liquid Polymeric Precursor to Silicon Nitride and Process", U.S. Pat. No. 4,397,828 (Aug. 9, 1983)]. The ammonolysis product, isolated from these solvents as a mobile oil, deviated somewhat from the ideal composition, —$[SiH_2NH]_n$—, being low in N and high in Si. Seyferth found, however, that the neat oil, although stable indefinitely under nitrogen at −30° C., loses ammonia at room temperature with resulting crosslinking to form a clear, insoluble glass.

Although this ammonolysis product was not stable at room temperature (under nitrogen) as a neat liquid, it was found to be stable in solution. In other studies of "inorganic" polysilazanes having the composition —$[SiH_2NH]_n$—, workers at the Toa Nenryo Kogyo Company in Japan [(a) M. Arai, S. Sakurada, T. Isoda, and T. Tomizawa, "Preceramic Polysilazane Precursors to Silicon-Nitride", Polymer Preprints, 1987, 28, 407; (b) K. K. Toa Nenryo Kogyo, Japanese Patent 84 207, 812, 1984; (c) M. Arai, T. Funayama, I. Nishii, and T. Isoda, Japanese Patent 62 125, 015, 1987] carried out the ammonolysis of the known $H_2SiCl_2$/pyridine adduct and obtained either viscous oils or resinous solids that also underwent crosslinking at room temperature. Using this technique, other workers at Toa Nenryo Kogyo disclosed an "inorganic" polysilazane that is either a viscous oil or a resinous solid having a molecular weight of 690-2,000 [(a) Unexamined, Published Japanese Patent Application 60-145,903, (b) M. Arai, T. Isoda, T. Itoh, "Inorganic Polysilazane and Method of Producing the Same", U.S. Pat. No. 4,840,778 (Jun. 20, 1989]. The polysilazane, however, crosslinks upon isolation from solvent and is then insoluble in organic solvents such as o-xylene.

By comparison, polysilazanes useful for the preparation of silicon carbide-containing ceramics are commonly called "organopolysilazanes" or "polycarbosilazanes" and are typically prepared by the gas phase ammonolysis of alkyl substituted halosilanes. Most useful of these have been the polysilazanes prepared from monomers where a silicon atom is bonded to one hydrogen atom and one alkyl group.

Such polysilazanes, having the formula —$[RSiHNH]_n$—, in which R is alkyl, aryl, or a substituted carbon-containing radical, differ from "inorganic" polysilazanes in that they are relatively stable at room temperature in the absence of solvent. For example, Brewer and Haber [S. D. Brewer and C. P. Haber, "Alkylsilazanes and Some Related Compounds", J. Am. Chem. Soc., 1948, Vol. 70, 3888] showed that the ammonolysis of methyldichlorosilane [$CH_3SiHCl_2$] gives a mixture of low molecular weight cyclic and (possibly) some low molecular weight, linear oligomers. According to Seyferth [D. Seyferth, "The Preparation of Silicon-Containing Ceeramics by Organosilicon Polymer Pyrolysis", Office of Naval Research, Contract N00014-82-K-0322, Technical Report No. 25, 1988] the ammonolysis product produced by the Brewer and Haber process, after filtration of precipitated ammonium chloride by-product, can be isolated as a mobile liquid. Its C, H, and N analysis and its spectroscopic (1H NMR, IR) data are in agreement with a $[CH_3SiHNH]_x$ formulation. Molecular weight determinations showed that the ammonolysis product of methyldichlorosilane produced by this procedure ranged in molecular weight from 280-320 grams/mol (Degrees of Polymerization of 4.7 to 5.4). Seyferth also demonstrated that this mixture of cyclic $[CH_3SiHNH]_x$ oligomers was not useful as a precursor to ceramic materials because it was necessary to crosslink this mixture of cyclic oligomers to a composition of higher molecular weight to give a composition having high pyrolysis yields of ceramic. Subsequent work by Seyferth focused on the preparation of crosslinked, but soluble, polysilazanes from these compositions through the dehydocoupling of Si—H and N—H bonds through the action of catalytic bases such as potassium hydride (KH) [D. Seyferth and G. Wiseman, "Preceramic Organosilazane Polymers", U.S. Pat. No. 4,482,669 (Nov. 13, 1984)].

Thus, while a number of processes have been attempted to prepare high molecular weight, linear polysilazanes comprising Si—H bonds that are stable upon isolation from solvent by a simple ammonolysis of halosilanes, similarly comprising Si—H bonds, all suffer the disadvantages of producing polysilazanes that either (1) have such a high degree of crosslinking so as to limit their utility, (2) crosslink upon isolation from solvent, (3) have a high fraction of relatively volatile, low molecular weight cyclic polysilazane oligomers, or (4) require subsequent processing by crosslinking to increase their molecular weight and utility. Lacking has been a process involving the simple, one step ammonolysis of halosilane monomers that results in a high yield of linear, uncrosslinked, high molecular weight polysilazanes that do not suffer from the drawbacks described above.

Apart from such considerations, prior art gas phase ammonolysis processes, such as those described above have all also demonstrated additional deficiencies. One has to do with an additional crosslinking mechanism which derives from the fact that the limiting reagent in such processes is ammonia. Since the reaction of ammonia with chlorosilanes is quite rapid (12 seconds to completion if methyldichlorosilane is used as the sole monomer) polysilazane that is initially formed upon addition of the gaseous ammonia according to equations (a), (b), and (c) is then left to dwell in the presence of an excess of unreacted chlorosilane and solubilized, ionized ammonium chloride by-product. Crosslinking can then occur according to the reactions shown in equations (d), wherein Si—NH—Si groups are activated to form condensation products comprising $NSi_3$ moieties, and the reactions shown in equations (e), wherein Si—H groups (in silazanes comprising Si—H bonds) are activated to form condensation products comprising SiN3 moieties.

    R1R2SiCl2+4NH3(l)→R1R2Si(NH2)2+2 NH4Cl     (a)

wherein $R_1$ and $R_2$ can independently be organic radicals or hydrogen

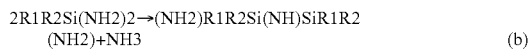
    2R1R2Si(NH2)2→(NH2)R1R2Si(NH)SiR1R2(NH2)+NH3     (b)

wherein $R_1$ and $R_2$ can independently be organic radicals or hydrogen

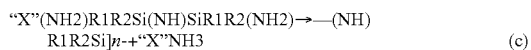
    "X"(NH2)R1R2Si(NH)SiR1R2(NH2)→—(NH)R1R2Si]n-+"X"NH3     (c)

wherein $R_1$ and $R_2$ can independently be organic radicals or hydrogen

    "X"(NH2)R1R2Si(NH)SiR1R2(NH2)+R1R2SiCl2→     (d)

wherein $R_1$ and $R_2$ are independently organic radicals or hydrogen

    "X"(NH2)R1R2Si(NZ)SiR1R2(NH2)+"X"HCl wherein Z=R1R2SiCl

"X"HCl+"X"NH3→"X"NH4Cl

    "X"(NH2)HSiR1(N*H)HSiR1(NH2)+"X"(NH2)HSi*R1(NH)HSiR1(NH2)     (e)

wherein $R_1$ is an organic radical

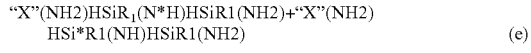
    "X"(NH2)HSiR1(N*Z)HSiR1(NH2)+"X"H2 where: Z=(NH2)Si*$R_1$(NH)HSiR1(NH2) and N* is bonded to Si*

Another deficiency has to do with inefficiencies inherent in the process itself. In processes involving ammonolysis with gaseous ammonia, as those mentioned above, the ammonia is typically passed, i.e., bubbled, through a solution of the organohalosilane in an inert organic solvent. Depending on the temperature of the solution and the rate of introduction, considerable losses of ammonia are incurred. In addition, significant amounts of solvent are carried away with the ammonia. These losses are not only uneconomical, but they also lead to pollution of the environment.

These losses can be avoided to a great extent via ammonolysis procedures utilizing gaseous ammonia under normal pressure only if the reaction is carried out at temperatures far below the evaporation temperature of ammonia, which is −33.4° C. Even with smaller batches, reaction temperatures of about −40° C. to −60° C. must be maintained to prevent sudden temperature increases due to the introduction of excessive amounts of ammonia, and local temperature fluctuations. Beyond that, there is always the acute danger in ammonolysis with gaseous ammonia that the gas feed pipes will be clogged by ammonium halide deposits. Ammonolysis under normal pressure with pre-liquified ammonia has the disadvantage of raising cooling problems, since the heat of reaction of chlorosilanes with anhydrous, liquid ammonia is highly exothermic and can result in a rapid rise in temperature above the boiling point of the anhydrous, liquid ammonia when it is maintained at atmospheric pressure.

When conducted under atmospheric pressure, the reaction of organohalosilanes with liquid ammonia—whether the ammonia is pre-liquefied or liquefied in solution—thus always requires temperatures below −40° C. To attain and maintain these low temperatures, elaborate cooling units and special insulating measures are required. The energy consumption for this type of cooling is high. Beyond that, the low temperatures and the great temperature fluctuations lead to rapid fatigue of the equipment employed, and the reaction vessels and associated equipment have only a short service life.

Circumventing the problems associated with the processing of polysilazanes having a high cyclic to linear character as well as those associated with a high crosslink density, Christophliemk et al [P. Christophliemk, R. Oezelli, and G. Tischbirek, "Process for Preparing Organosilazanes", U.S. Pat. No. 4,255,549 (Mar. 10, 1981)] teaches a process to prepare a film-forming composition comprising reacting a 5 to 15% by weight solution of trifunctional organohalosilane comprising no Si—H bonds in an inert solvent with excess liquid ammonia under pressure at temperatures between 0° and 50° C. Films formed from this solution are both adherent and flexible, suggesting a high molecular weight and, perhaps, some linear character. Since this condensation occurs at pressures and temperatures well below those at which thermally induced ring opening in the presence of excess ammonia has been shown to occur [C. R. Kruger and E. G. Rochow, "Polyorganosilazanes", J. Polymer Sci.: Part A, Vol. 2, 3179-3189 (1964)], it is likely that any linear characteristic in the polymer likely arises from stabilization of the linear or "ladderlike" structure of the initially formed ammonolysis products in the ammonium halide-anhydrous, liquid ammonia by-product, although the trifunctional character of the monomer predisposes the resulting polysilazane to crosslinking, even if considerable cyclic character is present. Stabilization would allow further condensation to occur in solution with retention of the some linear or "ladderlike" structure. Abel et al [A. E. Abel, T. A. Kruger, R. W. Mouk, and G. J. Knasiak, "Silazane and/or Polysilazane Compounds and Methods of Making", U.S. Pat. No. 6,329,487 (Dec. 11, 2001)], described below, teaches such a mechanism.

While the process taught in U.S. Pat. No. 4,255,549 represents a significant step toward circumventing the problems associated with cyclization and uncontrolled crosslinking in the manufacture of polysilazanes—both of which lead to processing difficulties when using such materials—the process described is both multi-step and quite complex and is not applicable to Si—H containing silazanes, wherein excessive crosslinking would occur. In addition, the '549 process, like most prior art processes, suffers from problems resulting from both (1) the precipitation of ammonium chloride by-product from the reaction mixture, and (2) the need for the time-consuming step of mechanical filtration, which only results in the incomplete of removal of the precipitated ammonium chloride from the reaction mixture. When a filtration step is used, the mixture is also hard to filter due to the adherence of the liquid, polysilazane product to the precipitated ammonium chloride salt. Because of this, the time required to effect the filtration is long, resulting in extended periods of time in which the polysilazane product is in contact with the by-product solution of ammonium halide in anhydrous, liquid ammonia. Since adsorbed ammonia on the surface of the precipitated ammonium halide by-product particles can cause substantial crosslinking in polysilazanes comprising Si—H and N—H bonds, if halosilanes comprising Si—H bonds are used as raw materials in the '549 process, while the product polysilazane produced by this method would have somewhat of a linear or "ladderlike" structure, there would invariably be a large amount of crosslinked polysilazane introduced into the final product, both from crosslinking introduced in the synthetic step, as well as from the polysilazane that remains adsorbed on the ammonium halide particle surface and which must be removed through repeated solvent washes. Such a separation process is also incomplete, and results in significant contamination of the polysilazane product with ammonium halide due to particulate ammonium halide that is smaller than the mesh size of the filter. This contamination affects the clarity and purity of the polysilazane when the polysilazane that is formed is a liquid. As mentioned above, all of the above-described processes, taught prior to the '549 patent suffer this drawback.

A variation of the process taught in U.S. Pat. No. 4,255,549 eliminates the use of an inert organic solvent, and teaches the ammonolysis of organohalosilanes that can additionally include organohalosilanes comprising Si—H bonds in anhydrous, liquid ammonia in a process that does not require the filtration of precipitated ammonium halide by-product. This process is described in U.S. Pat. No. 6,329,487 and takes advantage of the high solubility of the ammonium halide by-product in anhydrous, liquid ammonia at temperatures of ambient or above to intentionally facilitate controlled, catalytic crosslinking of the initially formed linear ammonolysis product comprising Si—H bonds by the ionized, dissolved ammonium halide salt. Initiation of crosslinking is demonstrated to occur when the polysilazane product is left in contact with the by-product solution of ammonium halide in anhydrous, liquid ammonia for periods of time of about one hour or greater. The duration of contact is, in part, dictated by the time required for chlorosilane addition to the reservoir of anhydrous ammonia in the batch process taught—which takes approximately one hour due to the large amount of heat generated by the exothermic reaction to form polysilazane—and the additional time required to achieve the degree of crosslinking desired.

In the process described in the '487 patent, the anhydrous, liquid ammonia reaction mixture is allowed to warm, over time, through heat of reaction, to temperatures of ambient or above in a pressure vessel, at which temperatures the ammonium chloride by-product is fully soluble in the anhydrous, liquid ammonia. Due to the large amount of ammonia used, the density of this solution is much less than the density of the silazane or polysilazane product. As a consequence of the different liquid densities of these liquids, as well as their pronounced differences in polarity, both of which promote phase separation, the polysilazane product and the solution of ammonium halide by-product in anhydrous, liquid ammonia spontaneously separate from one another upon standing at room temperature or above, and the denser polysilazane phase can then be separated from the less dense ammonium halide-liquified ammonia phase by gravity flow from a port at the bottom of the reaction vessel. Nevertheless, the time to achieve such temperatures and subsequent phase separation is sufficient to allow for further significant crosslinking of the polysilazane product by virtue of lengthy exposure to the anhydrous liquid ammonia solution of ammonium chloride which is the by-product of the reaction process. Furthermore, in such batch processing it is also known that a small amount (ca. 3%) of the total ammonia used in the process remains dissolved in the polysilazane product. This dissolved ammonia in the polysilazane contains solubilized, ionized ammonium halide salt which serves to further crosslink the polysilazane during a subsequent degassing step.

When Si—H containing organohalosilanes are employed as the raw material in the process taught in the '487 patent, and compared to the analogous ammonolysis products prepared by the traditional method of gaseous ammonia ammonolysis at ambient pressure (Example 6 of the '487 patent), novel polysilazanes result that are characterized in that they have both (1) a reasonably high molecular weight comprising a low ratio of cyclic to linear polymer segments due to the stabilization of the initially formed ammonolysis products of the reaction in the anhydrous liquid ammonia containing the ionized, dissolved ammonium halide, but (2) a high degree of crosslinking as evidenced spectroscopically by Fourier Transform Infrared Spectrometry in the reduced number of Si—H bonds in the final product compared to the number of Si—H bonds introduced in the halosilane starting material. The number of N—H bonds which are detected in the polymer is observed to rapidly decrease in proportion to the decrease in the number of Si—H bonds in the polymer as it is left to dwell in the presence of the ionized, dissolved ammonium halide in the anhydrous liquid ammonia solvent. The '487 patent thus describes a process utilizing no organic solvent, for the preparation of a, highly crosslinked, but processable polysilazane produced by inducing crosslinking in the polymer structure through the catalytic action of ammonium halide on the Si—H and N—H bonds contained within the polymer. Fourier Transform Infrared Analysis of both the polysilazane prepared by the process of the '487 patent compared to the polysilazane prepared by the traditional process of ambient pressure, gaseous ammonia ammonolysis is described in Example 6 of the '487 patent. FIG. 6 in that patent shows the decreased number of Si—H bonds in the polysilazane prepared by the '487 process, and FIG. 7 in that patent shows the greater linear versus cyclic character of the polysilazane prepared by the '487 process.

It is important to note that the crosslinked polysilazane composition obtained by the process of the '487 patent is achieved because, in the batch process that is described, the ammonolysis product of the Si—H containing halosilane remains in intimate contact with the acidic, solubilized and ionized solution of ammonium halide in liquified ammonia for a sufficient time to cause condensation of Si—H and N—H bonds in the ammonolysis product with the evolution of hydrogen gas. Since the addition of the halosilane raw material in the batch process described can only be achieved over a certain period of time due to the need to limit the rise of temperature and pressure in the reaction vessel to remain within equipment specifications, the ammonolysis product that is formed with the initial charge of halosilane comprises such crosslinks by the time the full complement of halosilane is added to the reactor. Addition times of approximately about one hour for the halosilane are reported, during which time silazane or polysilazane products that are formed during the early stages of chlorosilane addition have sufficient time to crosslink. Since FTIR analysis can only detect levels of chemical crosslink density greater than about 5% of the composition analyzed, it is clear from the FTIR spectra presented in the '487 patent that crosslinking must begin well before addition of the halosilane is fully accomplished.

A low cyclic to linear polymer segment ratio is achieved in the '487 patent because the linear structure of the initially formed ammonolysis product is stabilized in the anhydrous liquid ammonia containing the ionized, dissolved ammonium halide salt until the crosslinking mechanism initiates. This stabilization of linear structure is analogous to that effected in the '549 patent described above.

Nevertheless, in the batch process taught in the '487 patent difficulties arise in having to handle large volumes of liquid ammonia in the separation of the two phases, and many of the same problems encountered in the gas phase ammonia reactions described above are still encountered. In contemplating such problems, it occurred to us that most of these problems could be circumvented through the use of a continuous and rapid process involving anhydrous, liquid ammonia which does not entail the use of any organic solvent and in which the silazane and polysilazane products are rapidly isolated from the ammonium halide-anhydrous, liquid ammonia by-product. Furthermore, upon conceptualizing such a continuous process, and refining our ideas to provide for a fast and efficient means to produce large volumes of polysilazane, it then became clear to us that novel, uncrosslinked polysilazane compositions comprising Si—H bonds of unprecedented purity, clarity, and high molecular weight might result from such a continuous process.

U.S. Pat. No. 6,329,487 does, off-handedly, anticipate the formation of novel, albeit crosslinked polymers by a continuous process that would be consistent with the teachings of that patent. This is based on the assumption that the onset of crosslinking occurs almost immediately upon or very shortly after the addition of the halosilane raw material to the anhydrous liquid ammonia. However, the specification provides no evidence to this effect. To the contrary, Example 6 of the '487 patent assigns a time "T=0" which occurs only after the full complement of halosilane is introduced into the anhydrous liquid ammonia, a process which is described to take just under one hour. Thus, polymer that is formed immediately upon addition of the first portion of halosilane into the liquid ammonia is allowed to dwell in the presence of ionized ammonium halide in liquid ammonia for a period of almost one hour, accounting for the presence of some crosslink density in the product polymer even at time "T-0". This limitation derives from the time it takes to achieve complete addition of chlorosilane monomer in the batch process described due to the large amount of heat generated in the reaction and cannot be circumvented when such batch processing is employed. It does not anticipate a continuous process, as described in the instant invention, in which polymer separation from halosilane raw material and by-product solution of ammonium halide in anhydrous, liquid ammonia is effected at such a short time after polymer formation through a separation of phases of different densities induced by a high centrifugal force [wherein $F_c=mv^2/r$] that the polysilazanes that are obtained remain essentially linear polymers rather than subsequently crosslinking to form the ladder or fused cyclic polysilazanes through Si—H/N—H crosslinking that are taught in the '487 process. This surprising outcome was not taught nor anticipated in the '487 patent, since that patent teaches that a continuous process would similarly lead to the formation of the novel crosslinked polysilazanes described in the patent (Column 14, lines 61-62). One of average skill in the art would immediately understand that the utility of such linear versus crosslinked polymers resides in their enhanced processability, especially when high molecular weights are achieved.

Jeong [E. C. Jeong, "Method for Preparing Polysilazane Solution with Reducing Ammonia Substitution of Si—H Bond", U.S. Patent Application 2010/0210808 (Aug. 19, 2010)] describes a process utilizing organic solvent at low temperatures in which Si—H containing polysilazanes can be prepared in which activation of Si—H bonds by by-product ammonium halide can be minimized, but this process does not result in linear polymers of high molecular weight; rather, these polysilazanes contain cyclic and branched polymer materials.

SUMMARY OF THE INVENTION

In the process of the instant invention, polysilazane is continuously formed by a polymerization process whereby a continuous stream of halosilane—most preferably dihalosilane—and a continuous stream of anhydrous liquid ammonia are concurrently flowed into a centrifugal device that serves as both a reactor and a separator. The anhydrous, liquid ammonia-miscible aminosilane and low molecular weight silazane ammonolysis products that are initially formed (which are, themselves, liquids) are separated into a separate liquid phase from the by-product solution of ammonium halide in anhydrous, liquid ammonia through the action of a high centrifugal force that is exerted upon the reaction stream in the centrifugal device. High molecular weight, uncrosslinked linear polysilazanes having low cyclic content are subsequently formed from dihalosilane starting materials within the aminosilane phase through rapid condensation due to the high concentration of the aminosilanes in this separate liquid phase, even when Si—H containing halosilane raw materials are employed. Linear polysilazanes are obtained because such isolation of the diaminosilanes in a liquid phase that is strictly separated and isolated from the anhydrous, liquid ammonia ammonium halide by-product eliminates all possibility of activation of Si—H bonds by ammonium halide in those aminosilanes and low molecular weight silazanes, which would generate crosslinking through dehydrocoupling or transamination of sites originally containing Si—H radicals. Similarly, the high concentration of the undiluted aminosilane phase promotes intermolecular condensation of the aminosilanes and low molecular weight silazanes that are formed versus intramolecular condensations, the latter resulting in cyclic structures versus linear structures. The product polysilazanes are then directed from the centrifugal device to a product storage tank, while the by-product solution of ammonium halide in anhydrous, liquid ammonia is also directed from the centrifugal device to a separate by-product storage tank, after which several options to remediate the waste steam can be employed. A novel process employing a cone-bottom distiller is disclosed. When a cone-bottom distiller is used to recover ammonia from the waste stream of polysilazane production as taught in this invention, a novel, continuous process is enabled.

A system so configured can produce a variety of silazanes and polysilazanes. Optionally, although not a preferred embodiment of the instant invention, an organic solvent may be introduced into the centrifugal device along with the liquid ammonia, although the presence of such organic solvent is not preferred, as it introduces a further purification step of solvent removal and complications in phase incompatibility into the process after the reaction streams are separated. In preferred embodiments of the instant invention the centrifugal device is configured so as to provide four essential functions for polysilazane manufacture: 1) Mixing, 2) Reaction, 3) Cooling, and 4) Separation. In such preferred embodiments, a cone-bottom distiller is used to rapidly recover ammonia from the waste stream of the process, thereby enabling its re-use at the start of the process. An especially preferred embodiment employs the conversion of ammonium halide in the waste stream to ammonia borane before ammonia recovery in the cone-bottom distiller is effected.

DETAILED DESCRIPTION

Figure 1:
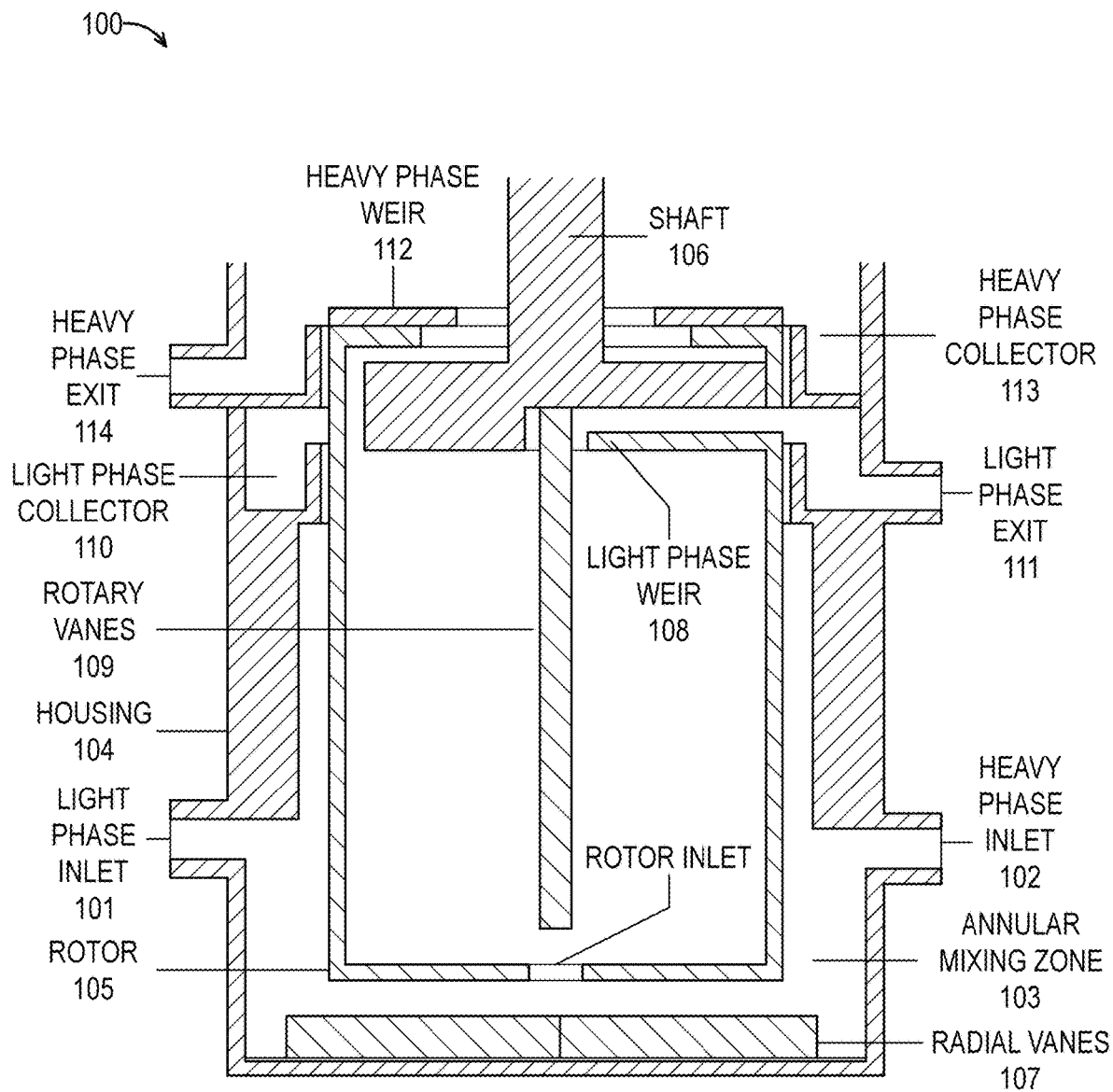
FIG. 1 is a diagram of an annular contactor.

Novel, high molecular weight, uncrosslinked linear polysilazanes having low cyclic content and comprising Si—H bonds wherein the number of Si—H bonds in the polysilazane are essentially equivalent to the number of Si—H bonds introduced from a dihalosilane reactant or reactants are prepared by a solventless, continuous manufacturing process utilizing a centrifugal device that serves as both a reactor and a separator. While particularly useful in the preparation of high molecular weight, uncrosslinked, linear polysilazanes from dihalosilanes comprising Si—H bonds, it should be understood that a variety of polysilazanes can be prepared by the process of the instant invention. Such polysilazanes need not be prepared from dihalosilane reactants comprising Si—H bonds, and may be prepared from a variety of halosilanes, including monohalosilanes, dihalosilanes, trihalosilanes, and tetrahalosilanes which may either contain or not contain Si—H bonds. Similarly, the process is generally applicable to any halogen containing monomeric raw material comprising silicon-halogen bonds, such as halodisilanes, halogen substituted carbodiimides, and the like. The sole requirement is that the monomeric raw material comprise at least one silicon-halogen bond. While not inclusive of all monomeric raw materials useful in the practice of the instant invention, the descriptions below are representative and describe the preparation of polysilazanes from dihalosilane reactants, particularly those comprising Si—H bonds, as they represent the class of polysilazanes of greatest commercial interest.

The unique feature of the process of the instant invention is the use of a centrifugal device to manufacture polysilazanes. The process is characterized in that the polysilazanes are prepared through a synthetic method that utilizes a high centrifugal force to rapidly separate low molecular weight silyl amine and silyl amine condensation products ("aminosilanes") as they are formed during initial ammonolysis of the halosilane raw materials, from the by-product waste stream of ammonium halide in anhydrous, liquid ammonia. While such liquid aminosilanes are typically miscible in anhydrous, liquid ammonia, the effect of centrifugal force on miscible liquids of different densities serves to separate the denser aminosilanes from the by-product ammonium halide-anhydrous, liquid ammonia phase, and concentrates these ammonolysis products in a separate liquid phase from the anhydrous, liquid ammonia phase prior to their condensation to polysilazane. By concentrating such ammonolysis products, a more rapid condensation of the ammonolysis products occurs due to the statistical proximity of these ammonolysis products to one another. Accordingly, unlike prior art processes to prepare polysilazanes, the instant invention teaches a process that is individually tailored to take advantage of the multi-step formation process involved in the synthesis of mature polysilazane polymers and avoids side reactions and complications arising from intimate contact of these silyl amines with both anhydrous, liquid ammonia, and ammonium halide that is solubilized and ionized in the anhydrous, liquid ammonia, leading to unwanted cross-linking.

The reaction is effected by concurrently introducing both a stream of halosilane and a stream of anhydrous, liquid ammonia into a centrifugal device, wherein ammonolysis occurs to form somewhat polar, monomeric and oligomeric silyl amine ammonolysis products that are miscible in the anhydrous, liquid ammonia-ammonium halide by-product but have a slightly higher density than the density of the by-product solution. While this density is not sufficient to effect an efficient phase separation under ambient temperatures and pressures, separation is promoted through the action of a centrifugal force imparted to the composition, causing a rapid separation of the ammonolysis products from the by-product and a consequent rapid condensation of the ammonolysis products to polysilazane. Such phase separation of miscible liquids in a centrifuge is known in the art, and is documented, for instance, in a paper by Y. Tsori and L. Leibler [Y. Tsori and L. Leibler, "Phase-separation of Miscible Liquids in a Centrifuge", C. R. Physique, Vol. 8 (2007) 955-960)]. Separation of the ammonium halide-anhydrous, liquid ammonia phase from the incipient, denser polysilazane phase that is then formed through subsequent condensation of the ammonolysis products is then further inertially effected through the centrifugation process, at which point the two streams are provided respective exit ports from the centrifugal device.

Preferred centrifugal devices are annular contactors, a schematic of which is shown in FIG. 1. Reaction and separation of aminosilanes in such a device can be effected in the annular "mixing" gap of the annular contactor, prior to condensation of such aminosilanes to high molecular weight polysilazanes in the rotor section of these devices.

A detailed description of the operation of an Annular Contactor 100, as depicted in FIG. 1, for the practice of the instant invention, involves the introduction of a continuous stream of anhydrous, liquid ammonia at the Light Phase Inlet 101 with simultaneous introduction of a continuous stream of halosilane, one non-limiting example is chlorosilane, at the Heavy Phase Inlet 102. Reaction occurs within the Annular Mixing Zone 103 between the Rotor the Housing 104 and the Rotor 105 of the Annular Contactor 100. The Rotor 105 is mechanically spun along Shaft 106 to provide the centrifugal force required to separate the reaction mixture. The reaction mixture exits the Annular Mixing Zone 103 of the Annular Contactor 100 at the bottom of the Rotor 105 at the Rotor Inlet 106, assisted by the Radial Vanes 107 positioned at the bottom of the device. Separation of the ammonolysis product and polysilazane phase from the resulting by-product ammonium chloride-anhydrous, liquid ammonia phase occurs through the action of centrifugal force upon the reaction mixture to separate the two phases as they travel upward along the interior walls of the Rotor 105. The two phases are entirely separated by the time they reach the Light Phase Weir 108, the light phase ammonium chloride-anhydrous, liquid ammonia occupying the volume closest to the rotational axis at the Rotary Vanes 109, and the heavy phase polysilazane product occupying the volume closest to the interior wall of the Rotor 105. The light phase then exits Rotor 105 through the Light Phase Weir 108, whereupon it collects in the Light Phase Collector 110 within the Housing 104 and then exits the Annular Contactor 100 through Light Phase Exit 111. The heavy phase continues upward along the inner wall of the Rotor 105 until it reaches the Heavy Phase Weir 112, at which point it is conducted to the Heavy Phase Collector 113 within the Housing 104, subsequently exiting through the Heavy Phase Exit 114. From the introduction of the separate reactant phases, to isolation of the product and by-product phases at their respective exit ports, the process of reacting and separating in the practice of the instant invention typically lasts less than about 3 minutes.

By combining such a rapid process to form polysilazane with efficient ammonia recovery from the ammonium halide and anhydrous, liquid ammonia by-product using a cone-bottom distiller, a continuous process is enabled, whereby the ammonia that is recovered from the by-product is efficiently returned to the start of the process to effect a continuous manufacture of polysilazane.

As compared to prior art processes, wherein 1) anhydrous ammonia in either gas or liquid form is introduced into a stirred halosilane solution in solvent or 2) a halosilane is introduced directly into a stirred or otherwise agitated reservoir of anhydrous liquid ammonia, the method of the novel process of the instant invention results in the formation of high molecular weight, linear polysilazanes having low cyclic content, even when Si—H containing halosilane raw materials are employed. This obtains by virtue of the fact that the silyl amines and silazane oligomers that quickly form from the monomeric aminosilanes that result from the ammonolysis reaction (the reaction kinetics using a closed calorimeter indicate that complete ammonolysis occurs in less than 12 seconds from start to completion) are very quickly removed from the reactive ammonium halide-anhydrous liquid ammonia environment as a separate phase before they begin to condense to high molecular weight, thereby stabilizing linear silazanes that are proximate to a high concentration of other aminosilanes and other linear silazanes that can then further condense to linear polymers. Furthermore, during condensation, no ammonium halide is then present in this phase to catalytically act upon the polysilazane that is formed to result in crosslinked compositions through dehydrogenative or transaminative coupling. Upon achieving sufficient molecular weight, the polysilazanes that ultimately form are then sufficiently nonpolar and of sufficient density to spontaneously remain separate from the by-product ammonia phase, even under ambient conditions of temperature and pressure.

In such a mechanism, the relative proportions of anhydrous, liquid ammonia to halosilanes that are introduced in the two feed streams is not critical provided that a sufficient excess of anhydrous, liquid ammonia is employed. Because of the reaction conditions, reaction completion requires only 2.0× the number of moles of anhydrous, liquid ammonia per mole of halosilane Si—Cl bonds, although a large excess of anhydrous, liquid ammonia is greatly preferred, both to reduce the density of the by-product ammonium halide-anhydrous, liquid ammonia solution as well as to accentuate the difference in polarity between the product polysilazane and the by-product ammonium halide-anhydrous, liquid ammonia solution. This enhances the ease of separation of the two phases that result from the reaction as a result of the lower density of the by-product ammonium halide, anhydrous, liquid ammonia solution.

Additionally, while ammonium halides are readily soluble in anhydrous, liquid ammonia, they are only marginally soluble in concentrated solutions of aminosilanes and low molecular weight silazanes in anhydrous, liquid ammonia. If a high concentration of these aminosilanes and silazanes in the solution of ammonium halide in anhydrous ammonia is locally encountered, the ammonium halide that is in solution can precipitate from solution and clog process equipment. The rapid separation of these low molecular weight aminosilanes from the ammonia phase prevents the premature precipitation of ammonium halide by-product from the anhydrous, liquid ammonia phase, thereby circumventing any clogging of process equipment.

Furthermore, the novel process of the instant invention provides for the rapid separation of the oligomeric aminosilane ammonolysis products from the by-product that contains solubilized and ionized ammonium chloride, which is particularly important when Si—H containing halosilanes are employed, so that catalytic polymer chain crosslinking is prevented during aminosilane condensation and once the linear polysilazane chains are formed.

The novel process of the instant invention thus comprises the steps of: a) contacting a flowing stream of halosilane with a flowing stream of anhydrous liquid ammonia in the chamber of an operating centrifugal device that is capable of inertially separating intermediate product streams of aminosilane ammonolysis products of slightly different densities and polarities from anhydrous, liquid ammonia-ammonium halide by-product through a centrifugal force of sufficient magnitude to effect such separation, b) allowing a dwell time in the centrifugal device sufficient to fully provide for the reaction of the halosilane reactant with the anhydrous, liquid ammonia to form aminosilanes that are soluble in the anhydrous liquid ammonia, c) further allowing a sufficient dwell time in the centrifugal chamber to allow for the separation of these aminosilane intermediates from the anhydrous, liquid ammonia-ammonium halide by-product in a separate liquid phase and, finally, d) further allowing a sufficient dwell time in the centrifugal device to provide for at least a partial condensation of the aminosilane products to a degree of polymerization where the resulting, oligomeric or polymeric silazanes are less polar and denser than the ammonium halide-anhydrous liquid ammonia by-product solution and can remain separated from the by-product ammonium halide-anhydrous liquid ammonia solution at ambient temperatures and pressures, and e) subsequently collecting the separate phases of oligomeric and/or polymeric silazane product and by-product ammonium halide-anhydrous liquid ammonia that exit the centrifugal device through separate exit ports. As stated above, in this process the ammonolysis products that form are separated from the by-product of a solubilized and ionized solution of ammonium halide in anhydrous, liquid ammonia at times that are very significantly less than those which are required to catalytically crosslink the aminosilane ammonolysis products and reduce the number of Si—H bonds relative to the quantity of Si—H bonds that are incorporated into the resulting novel silazanes and/or polysilazanes from the halosilane(s) of step (a) when Si—H containing halosilanes are used as raw materials in the manufacture of Si—H containing polysilazanes. Such times are preferably less than 10 minutes, more preferably less than 5 minutes, and most preferably less than 3 minutes. In the subsequent condensation step, the polysilazanes that form are of a high molecular weight as a result of their opportunity to self-condense in a liquid phase consisting essentially of only aminosilanes and oligomeric silazanes, and (b) have a low ratio of cyclic to linear polymer segments, because of (1) the high concentration of aminosilanes and oligomeric silazanes (essentially 100%) in the dense phase that predisposes intermolecular condensation over intramolecular cyclization, and (2) the induced pressure imposed by the centrifugal force. Such a propensity for the formation of linear versus cyclic polysilazane structures when the polysilazanes are formed by an ammonolysis of halosilanes under induced pressure has been demonstrated in the art by, for instance, Redl [G. Redl, "Silazane Polymers", ARPA Contract SD-88, October 1965].

When such a process is employed and combined with an ammonia recovery step utilizing a cone-bottom distiller, the manufacture of the novel silazane and polysilazane compositions of the instant invention can be run fully continuously with a continuous recovery of both product and waste streams. In such instances the speed at which each of the individual steps of the process are accomplished is tailored such that an uninterrupted flow of material through the process is maintained. The recovered ammonia from the waste stream can be immediately used at the front end of the process to manufacture additional polysilazane.

It is here informative to describe the chemical reactions which occur in the preparation of oligomeric and/or polymeric silazanes from the ammonolysis of a halosilane(s) in anhydrous, liquid ammonia in the process of injecting a stream of halosilane(s) into a stream of anhydrous, liquid ammonia that is flowed into a centrifugal device. The reactions involved in the formation of polysilazanes via the ammonolysis of chlorosilanes in a centrifugal device are detailed in chemical equations f-h:

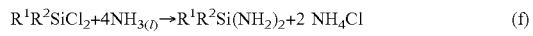  (f)

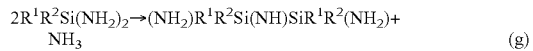  (g)

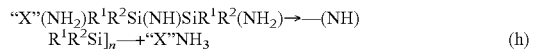  (h)

The kinetics of the initial reaction of anhydrous liquid ammonia with, for example, chlorosilanes as the silane raw material (which shall be used as representative of the wide variety of halosilanes that can be used in the practice of this invention) to form monomeric ammonolysis reaction products (aminosilanes and silazanes) is exothermic and very rapid. The reaction proceeds to completion in significantly less than 12 seconds when methyldichlorosilane is used. Independent analysis of the kinetics and thermodynamics of the reaction indicate that the reaction is essentially complete after 4 seconds of ammonolysis. Since a large excess of ammonia is used, the reaction kinetics of the ammonolysis step are assumed to be pseudo-first order. If, conservatively, a 5 half-life completion time of even up to 6 seconds is assumed for the ammonolysis step, a rate constant of 0.58 s-1 would apply.

Depending on the chlorosilanes used, heats of reaction of from 1,150 Btu/lb of polysilazane to about 1,450 Btu/lb of polysilazane are observed.

Accordingly, the first reaction step in a continuous process wherein a stream of chlorosilane is injected into a stream of anhydrous liquid ammonia results in the very rapid ammonolysis of the halosilanes to form aminosilane monomers which remain in solution with the anhydrous liquid ammonia. The resulting reaction stream after this first reaction step thus consists of an anhydrous, liquid ammonia solution of both polar, monomeric aminosilanes and low molecular weight silazanes which are miscible in the anhydrous, liquid ammonia-ammonium chloride by-product.

It is important to note that this homogeneous solution obtains only in situations where the concentration of the aminosilanes and silazanes in the anhydrous liquid ammonia is relatively low. If, however, the concentration of these aminosilanes and silazanes in the anhydrous, liquid ammonia increases in any region of the reaction stream as a result of, for example, insufficient mixing of the ammonolysis products with excess ammonia in the reaction stream, the ammonium chloride by-product salt becomes less and less soluble in that region of the solution as the concentration of ammonolysis products increases, and the ammonium chloride then precipitates out of the reaction stream. This situation is problematic when, for instance, low rates of flow are employed in order to ameliorate heat generation in a continuous reactor that utilizes, for instance, a static mixer to promote the reaction between anhydrous, liquid ammonia and an injected stream of chlorosilane(s), since it results in a precipitation of a solid salt phase that requires mechanical removal from the product stream versus a clean separation of two liquid phases in the centrifuge. This should be avoided under all circumstances, since it can result in clogged feed and injector lines and other critical components of the reactor. A second complication, however, arises when Si—H containing ammonolysis products remain in solution and become protonated by the solubilized and ionized ammonium chloride that is formed in the ammonolysis of the chlorosilane reactant. The result is the formation of a crosslinked composition as detailed in U.S. Pat. No. 6,329,487, included by reference herein.

Due to the complication of ammonium chloride precipitating from the reaction stream when the reaction stream contains a high concentration of dissolved ammonolysis products, prior art processes were only possible when vigorous mixing of the reaction stream from the time the ammonia-soluble ammonolysis products formed until the second step of the reaction to form higher molecular weight silazane oligomers and polymers by condensation occurred; this, due to the fact that rapid mixing dispersed the ammonolysis products into regions having a high ammonia to ammonolysis product ratio wherein the by-product ammonium halide was still soluble. However, such systems typically utilized stirred batch reactors, wherein the injected halosilane was introduced into a large reservoir of vigorously stirred anhydrous, liquid ammonia, thereby somewhat circumventing the problem (see, for example, U.S. Pat. No. 6,329,487). In the absence of such mixing, the concentration of ammonolysis products in the anhydrous, liquid ammonia phase near the point of injection (such as is the case for a system that employs a static mixer) increases to the extent that the ammonium halide by-product precipitates from solution. In the practice of the instant invention this complication is very effectively circumvented by the action of the centrifuge upon the reaction stream, wherein the ammonolysis products are very rapidly separated from the by-product anhydrous, ammonia-ammonium halide solution, by virtue of their higher densities, through the action of a centrifugal force, to form a separate liquid phase. This, concurrently, also circumvents the second complication of catalyzed, Si—H/N—H dehydrocoupling and crosslinking, because when this occurs, the ammonolysis products are no longer in intimate contact with the solubilized and ionized ammonium chloride by-product. Such rapid separation cannot be effected under ambient conditions, but only through the action of the centrifugal force imparted to the reaction mixture.

The second step of the reaction involves condensation of the ammonolysis products within the separate liquid phase to form, first, silazane dimers, then oligomers and, finally, polysilazane polymers. While the kinetics of this process are somewhat slower than the initial reaction kinetics, the rate of this condensation is increased in the process of the instant invention compared to prior art processes due to the isolation of the ammonolysis products in a single, concentrated phase. This condensation process continues until the density of the resulting, relatively non-polar silazane oligomers and/or polymers substantially exceeds the density of the by-product solution of ammonium chloride in the anhydrous, liquid ammonia, whereupon the non-polar silazane oligomers can easily remain separate as a single-component, dense silazane layer from the polar and less dense anhydrous, liquid ammonia that still contains the by-product ammonium chloride in solution, even under ambient conditions of temperature and pressure. While this second step of the reaction is quite a bit slower than the initial ammonolysis step, in the practice of the instant invention it still requires a period of about 1 minute to about 2 minutes from the time the initial aminosilanes are completely formed to the time that the incipient silazane oligomers condense to a molecular weight at which they are non-polar enough and dense enough to spontaneously separate from the ammonium chloride-anhydrous liquid ammonia phase in a centrifugal device, depending on the centrifugal acceleration imparted to the mixture of polysilazane product and by-product ammonium chloride and anhydrous, liquid ammonia. Subsequently, further polymerization to higher molecular weights is promoted in these short condensation times by virtue of the fact that silicon-containing species are fully concentrated in a separate phase (close proximity to one another) rather than being physically separated from one another at a much lower concentration within the by-product ammonium chloride/anhydrous liquid ammonia phase.

A unique process feature of the instant invention, whereby phase separation is effected inertially in a centrifugal device is, thus, two-fold: 1) low molecular weight aminosilanes and silazanes that are rapidly formed on halosilane ammonolysis and which are miscible in anhydrous, liquid ammonia are rapidly separated from the resulting ammonium halide and anhydrous, liquid ammonia by-product of the ammonolysis, and 2) the condensed polysilazane and anhydrous, liquid ammonia-ammonium halide by-product phases that form upon subsequent condensation of the initially formed aminosilanes can be continuously separated as the denser and less polar polysilazane phase is formed in the liquid phase containing the initial ammonolysis products of the reaction, and at a much faster rate than under ambient conditions of settling. As stated above, this results, compositionally, in polysilazanes that, despite having Si—H bonds, do not have branched and, consequentially, crosslinked structures, and indeed these polysilazanes are also statistically predisposed to non-cyclic structures. Linear polysilazanes are obtained because the isolation of the diaminosilanes and low molecular weight silazanes that are formed in a liquid phase that is strictly separated and isolated from the anhydrous, liquid ammonia-ammonium halide by-product eliminate all possibility of activation of Si—H bonds in those aminosilanes and low molecular weight silazanes to generate branching through dehydrocoupling or ammonolysis of sites originally containing Si—H radicals. The prior art is replete with examples of the preparation of uncrosslinked polysilazanes that do not comprise Si—H bonds—which are prerequisite to a crosslinked structure when dihalosilanes are used as starting material. Examples cited in a paper by Andrianov [D. Ya. Zhinkin, E. A. Semenova, L. M. Tartakovskaya, N. V. Markova, and K. A. Andrianov, "Ammonolysis and Aminolysis Reactions of Dichlorodimethylsilane", Khimiya Geterotsiklicheskikh Soedinenii, Vol. 2, No. 5, pp 791-795 (1966)], incorporated in its entirety by reference herein, are cited to demonstrate that the preparation of such uncrosslinked polysilazanes either by a batch process involving the ammonolysis of dichlorodimethylsilane in dilute solution (16.7 wt %) by either gaseous ammonia or liquid ammonia results entirely in uncrosslinked cyclosilazanes versus linear polysilazanes, thereby demonstrating the importance of Si—H bonds in the crosslinking of silazanes formed by an ammonolysis or aminolysis of halosilanes. The formation of cyclosilazanes in such dilute solutions of dichlorodimethylsilane also demonstrates how the high concentration of the undiluted aminosilane phase in the instant invention statistically promotes intermolecular condensation of the aminosilanes and low molecular weight silazanes that are formed versus intramolecular condensations, the latter resulting in cyclic structures versus linear structures as shown in the Andrianov reference cited above wherein the aminosilanes formed are present in high solvent dilution.

As put forth in the above-mentioned paper by Y. Tsori and L. Leibler [Y. Tsori and L. Leibler, "Phase-separation of Miscible Liquids in a Centrifuge", C. R. Physique, Vol. 8 (2007) 955-960)], the separation of miscible liquids can be accomplished using centrifugal devices, in which the critical angular velocity to separate two liquids is given by the expression:

$$\omega_c^2 = \frac{4k_B T}{v_o \Delta p} \frac{f_m''(\phi_0)}{(R_2^2 - R_1^2)} (\phi_t - \phi_o) \quad (1)$$

where $\omega_c$ is the angular velocity, the Boltzmann Constant $k_B = 1.38 \times 10^{-23}$ m$^2$kg/s$^2$K, T=the temperature in degrees Kelvin, $v_o$=the molecular volume in m$^3$, $\Delta p$=the density difference between phases in kg/m$^3$, $f_m''(\phi_o)$=the second derivative of the free energy density, $\phi_o$=the initial volume fraction of the phases (phase ratio of the bi-component liquid mixture), $\phi_t$=the transitional separation volume fraction of the phases (phase ratio of the bi-component liquid mixture at which demixing occurs), $R_2$=the outer radius of the centrifuge separation volume in meters, and $R_1$=the inner radius of the centrifuge separation volume, also in meters.

To solve this equation, $\phi_t$ can be calculated from the relationship:

$$N\chi = \frac{1}{2\phi_t - 1} \ln[\phi_t/(1 - \phi_t)] \quad (2)$$

where N=1 for small molecules, and the Flory-Huggins Parameter, $\chi$ is set equal to 0.5.

Using the values for N and $\chi$ above, $\phi_r$ can be conveniently determined by approximating ln $[\phi_r/(1-\phi_r)]$ as the series expansion:

$$\ln[\phi_r/(1-\phi_r)] = \phi_r + [(\phi_r-1)/\phi_r] + \frac{1}{2}[(\phi_r-1)/\phi_r]^2 + \frac{1}{3}[(\phi_r-1)/\phi_r]^3 + \ldots \quad (3)$$

[valid for $\phi_r > \frac{1}{2}$] and truncating the series after the second term.

Similarly, $f_m''(\phi_o)$ can be calculated using the following relationship:

$$f_m''(\phi_o) = 1/\phi_o + 1/(1-\phi_o) - 2\chi \quad (4)$$

By substituting the correct quantities into the above equations, it can be found that to separate ammonia-miscible, monomeric aminosilanes that are initially formed in the ammonolysis reaction of methyldichlorosilane at an initial bi-component liquid phase ratio, $\phi_o$ about 0.37, a rotational speed of about 4,800 rpm is required in, for instance, a CINC V-05 annular contactor (Costner In Nevada Corporation) having an annular gap in the mixing/reaction zone of 0.0127 m. To effect the separation of dimeric aminosilanes that are formed from the initial condensation of such monomeric aminosilanes, a rotational speed of about 2,800 rpm is required. And to effect the separation of trimeric aminosilanes that are formed from the initial condensation of these two aminosilanes, a rotational speed of about 1,600 rpm is required. No complications arise from separation of ammonium chloride salt from the anhydrous, liquid ammonia-ammonium chloride salt solution since it is well known in the art that soluble salts do not centrifugally separate from solution. See, for example, informational literature published online by Dolphin Marine & Industrial Centrifuges [S. Prabhu, "Can a Centrifuge Separate Salt from Water?", Dolphin Marine & Industrial Centrifuges (2020) at https://dolphincentrifuge.com/can-a-centrifuge-separate-salt-from-water/], which explains the inability to centrifugally separate salts from solution. The impact of centrifugal force on the separation of miscible liquids of different densities can be better appreciated by considering the case where two immiscible liquids of different densities undergo separation. Under an ambient gravitational acceleration of 1 g, the velocity, $U_t$ in meters/second (and hence the time) to separate, for instance two immiscible liquids such as a polysilazane and a solution of ammonium halide in anhydrous, liquid ammonia, having different densities, and with a defined droplet diameter, $D_p$ in meters, is given by Stokes Law:

$$U_z = \frac{gD_p^2(\varrho_h - \varrho_l)}{18\mu} \quad (5)$$

where g=9.81 m/sec$^2$; $\rho_h$=the density of the polysilazane product in kg/m$^3$; $\rho_l$=the density of the by-product ammonium halide-anhydrous, liquid ammonia solution in kg/m$^3$; and $\mu$=the kinematic viscosity of the by-product ammonium halide solution in anhydrous, liquid ammonia in Pascal-seconds (Pa s).

In Stokes Law the time to separate the two, immiscible phases depends on the difference in densities of the two liquids. In the prior art, the speed of separation was thus increased by adding a large excess of low density ammonia to maximize the difference in densities between the product polysilazanes and the by-product ammonium halide-anhydrous, liquid ammonia solution.

However, by effecting the separation in a centrifugal device, the centrifugal acceleration that can be imparted to the two immiscible phases is increased by two to three orders of magnitude, thereby dramatically increasing the speed of their separation. As shown below, at the recommended operating speed of 3,600 rpm, the centrifugal force experienced at the wall of a CINC V-05 Annular Contactor (described below) is approximately 900 times that imparted by gravity. So, for any given droplet size of polysilazane product and difference in density between that polysilazane product and by-product ammonium halide-anhydrous, liquid ammonia solution the speed at which the two liquid phases separate is increased 900-fold over ambient conditions.

Figure 2:
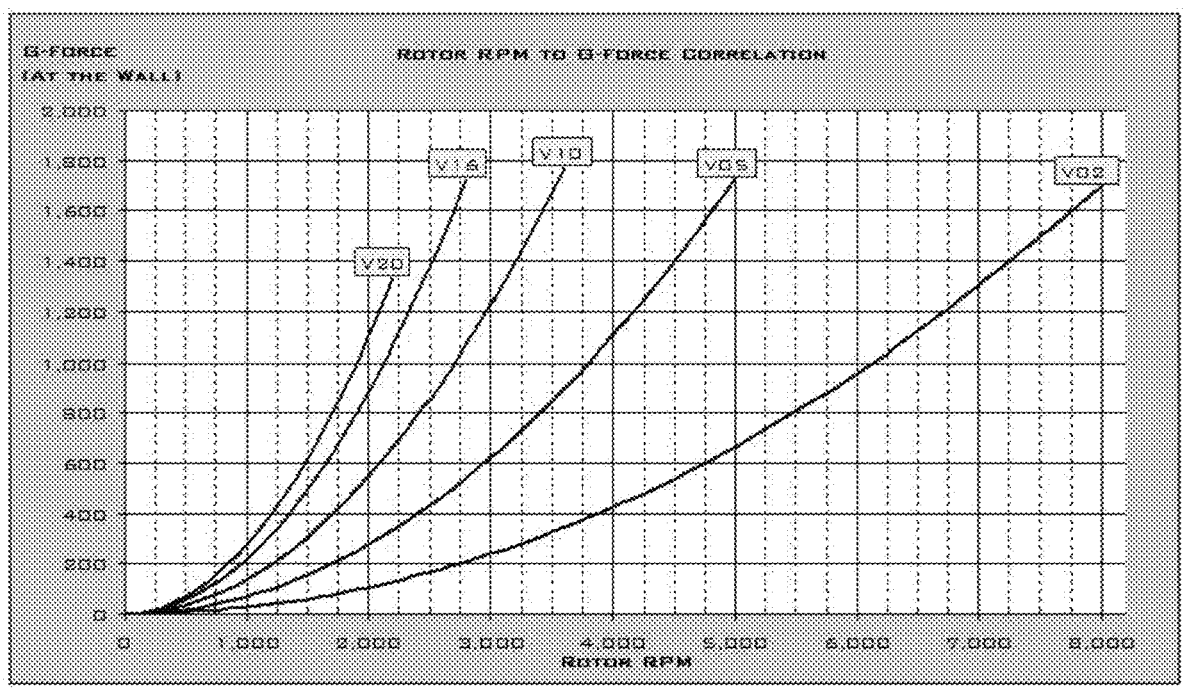
FIG. 2 shows the correlation of CINC annular contactors' rotor RPM to G-Force

Perhaps of equal import, since the speed at which separation occurs is much greater in a centrifugal device, it allows for a much smaller difference in density between polysilazane product and by-product ammonium halide-anhydrous, liquid ammonia solution to effect the same speed of separation. At 3,600 rpm the centrifugal acceleration inside a CINC V-05 Annular Contactor is "900 g" versus "1 g" under Ambient Conditions, as shown in FIG. 2.

This is quite significant in that, instead of using, for instance, a 20-fold excess of anhydrous liquid ammonia in order to increase the difference in density between the polysilazane and by-product ammonium halide-anhydrous, liquid ammonia solution, a much smaller excess can be used, limited only by the solubility of the ammonium halide in anhydrous, liquid ammonia at any given temperature. As described above, rapid separation of the two phases of the reaction stream is also the key to the formation of the high molecular weight, linear polysilazanes of the instant invention. Because the low molecular weight (degree of polymerization less than just a few repeat units), ammonolysis products are very quickly removed from the by-product solution of solubilized ammonium halide in the anhydrous, liquid ammonia as soon as their densities increase to the point that they can be effectively separated under the high centrifugal force imparted by the centrifugal device, the product polysilazanes that result from such subsequent intermolecular condensations of the ammonolysis products have the following features: 1) they are both linear and uncrosslinked—especially in the case of Si—H containing polysilazanes—since branching and crosslinking in such liquid ammonia processes, as taught in U.S. Pat. No. 6,329,487 largely results from the action of solubilized and ionized ammonium by-product in anhydrous, liquid ammonia that acts upon the growing silazane condensation polymers, and 2) they contain a very low percentage of cyclic material, since the oligomeric silazanes that form are immediately separated from the anhydrous, liquid ammonia phase into a separate, very concentrated phase that promotes condensation in linear fashion versus the cyclization that often occurs in more dilute concentrations of condensable aminosilanes and low molecular weight silazanes.

In the process of the instant invention, the centrifugal device that acts as both reactor and separator is maintained at such a temperature and pressure (typically ambient temperatures or slightly above, and pressures of above 50 psi to about 120 psi) such that the by-product ammonium halide of the reaction retains full solubility in the anhydrous, liquid ammonia after reaction completion, but is not so hot as to produce unacceptable pressures in the process equipment. Nor are such temperatures and pressures kept so low so as to promote precipitation of the ammonium halide from solution. In the process of the instant invention the flow of anhydrous, liquid ammonia into the centrifugal device is additionally maintained at a level so as to provide a by-product solution of ammonium halide in anhydrous, liquid ammonia that has a density which, at all times, is greater than at least about 0.05 grams/ml different density from the final, product polysilazane, as opposed to 0.10 grams/ml in the absence of a centrifugal acceleration. This ensures complete phase separation upon reaction completion within the centrifugal device. While chlorosilanes are used as the silicon-containing raw materials in the preparation of silazanes and polysilazanes in the above descriptions, it should be understood that other halosilane starting materials, such as other bromosilanes and iodosilanes could be used.

The relative proportions of anhydrous, liquid ammonia to halosilanes that are introduced in the two feed streams is not critical, but should preferably result in a by-product solution of ammonium halide in anhydrous, liquid ammonia that has a density equal to or less than about 0.75 g/ml so that rapid phase separation of aminosilane ammonolysis products (that typically have densities of between 0.75 gm/ml and 0.80 g/ml) can be achieved. This has been experimentally determined to provide an optimum separation process. Full ammonolysis of one mole of dihalosilane monomer requires four (4) moles of anhydrous, liquid ammonia [see reactions (a), (b), and (c)]. Two of the four moles of ammonia are required to generate the aminosilane that is the building block of the polysilazane polymers, and the remaining two moles of anhydrous, liquid ammonia are required to act as "receptors" of the by-product, halic acid that is formed in the ammonolysis reaction. Therefore, at a minimum, a ratio of about 10 moles of anhydrous, liquid ammonia per mole of dihalosilane should be employed. This excess of anhydrous, liquid ammonia is desirable in order to achieve an effective density difference between: 1) the ammonolysis products and the by-product anhydrous, liquid ammonia solution of ammonium halide and, 2) the product polysilazane phase and the by-product solution of ammonium halide in anhydrous, liquid ammonia. Ratios of about 10:1 to 15:1 of anhydrous, liquid ammonia per dihalosilane monomer are preferred and have been found to work quite well to satisfy the limitations of the reaction conditions, although this depends on whether the dihalosilanes used in the practice of this invention are dichlorosilanes, dibromosilanes, or diiodosilanes.

While a variety of centrifugal methods can be envisioned to 1) effect the mixing of a halosilane stream with an anhydrous, liquid ammonia stream, resulting in their reaction to form aminosilanes and, then, 2) effect the subsequent separation of condensed oligomeric and/or polymeric silazanes from by-product ammonium halide-anhydrous, liquid ammonia, as mentioned above, a preferred method entails the use of a centrifugal device called an "annular contactor". An annular contactor, as shown in FIG. 1, is a centrifugal device has two inlet ports for the introduction of liquids into the device. The mixing of the two liquid phases is achieved in an annular contactor in the annular gap between the spinning rotor and the fixed housing where the reaction occurs (FIG. 1). Seconds later, when the resulting, aminosilane phase is formed, the centrifugal force exerted by the centrifugal action imparted by the annular contactor separates the denser, aminosilane phase (the "heavy phase") from the less dense by-product solution of ammonium halide in anhydrous, liquid ammonia (the "light phase") in this annular gap. As these two liquid phases then transfer to the rotor in the annular contactor and rise in the contactor, intermolecular condensation of the aminosilanes in this concentrated phase with, first, the formation of oligomeric and then polymeric silazanes occurs. Upon reaching the upper portion of the annular contactor, the "light" ammonium halide-anhydrous liquid ammonia phase exits at a port that is lower than the port where the "heavy" silazane phase exits.

Due to the complete nature of the separation of ammonium halide and anhydrous, liquid ammonia from, initially, the aminosilane phase that is formed and, subsequently, the polysilazane product when centrifugal separation means are employed, it is not necessary to subject the liquid stream of polysilazane to further purification as is required, for instance, in the '487 patent. In processes such as that described in the '487 patent, the polysilazane that is isolated after gravity-effected separation from the by-product ammonium halide solution in anhydrous, liquid ammonia, still contains small amounts of the by-product solution of ammonium halide in anhydrous, liquid ammonia—often resulting from inclusion in the polysilazane phase of what is sometimes referred to as the "shag line" at the interface of the polysilazane phase and ammonium halide-anhydrous, liquid ammonia phase when separation is being effected—and must be transferred to a crystallizer where the raw product is then heated to evaporate any residual ammonia in which any residual by-product ammonium halide is dissolved. At this point the residual ammonium halide by-product then crystallizes from the raw product polysilazane and the product is passed through a polishing filter to a vacuum stripper. In a vacuum stripper trace amounts of ammonia are then removed under high vacuum. The continuous process of the instant invention obviates these subsequent, cumbersome processing steps due to the inertial force that is constantly applied to the product stream before exiting the centrifugal device, thereby efficiently removing any anhydrous, liquid ammonia and solubilized and ionized ammonium halide from the silazane and/or polysilazane product. It is also important to note that, while remaining in solution in the polysilazane product when prior art methods are employed, this small amount of ammonia (ca. 3% of the total amount of ammonia used) also containing a significant amount of acidic ammonium halide by-product therein solubilized, also acts to promote the novel crosslinked polysilazane composition of the '487 patent when Si—H containing polysilazanes are produced. Using the process of the instant invention, no residual, dissolved ammonia containing solubilized, acidic ammonium halide is present in the product polysilazane, so that the novel, essentially linear Si—H containing polysilazanes of the instant invention, remain uncross-linked.

As described above, and in a preferred embodiment of the instant invention, it has thus been discovered that in such a process as described above, when a rapid and continuous means of silyl amine ammonolysis product separation from by-product solution of ammonium halide in anhydrous, liquid ammonia is effected at (1) a temperature, pressure, and concentration at which the by-product ammonium halide is still fully soluble in the anhydrous liquid ammonia that is employed in this process, and (2) at ammonium halide concentrations in the anhydrous, liquid ammonia at which the density of the ammonium halide solution in anhydrous liquid ammonia is less than about 0.75 grams/ml, the resulting polysilazane polymers are then further characterized by their exceptional purity and clarity. Halide contamination in the product polysilazane resulting from ammonium halide by-product are observed at levels of less than a few parts per billion, and the clarity of these polymers is, correspondingly, much higher than those polymers that are obtained by allowing a gravity-effected phase separation of the polysilazane from the resulting ammonium halide-anhydrous, liquid ammonia. Exceptionally low levels of haze can be obtained, which is not possible using a simply gravity-effected phase separation.

Also, as further stated above, the novel polysilazanes of the instant invention: (1) do not have any of the chemical crosslinks that are typically introduced into the product polymer by preparing polysilazanes comprising Si—H bonds in a solventless, anhydrous liquid ammonia process such as that taught in U.S. Pat. No. 6,329,487, and (2) are of high molecular weight and have a low ratio of cyclic to linear polymer segments.

To summarize, the process of the instant invention comprises the steps of: a) contacting a flowing stream of halosilane with a flowing stream of anhydrous, liquid ammonia in the chamber of an operating centrifugal device that is capable of inertially separating a product stream of aminosilane and silazane ammonolysis intermediates of slightly different densities and polarities than a stream of anhydrous, liquid ammonia-ammonium halide by-product through a centrifugal force of sufficient magnitude to effect such separation, b) allowing a dwell time in the centrifugal device sufficient to fully provide for the reaction of the halosilane reactant with the anhydrous, liquid ammonia to form polar, aminosilanes and silazanes that are soluble in the anhydrous liquid ammonia, c) further allowing a sufficient dwell time in the centrifugal device to allow for the separation of these aminosilane and silazane intermediates from the anhydrous, liquid ammonia-ammonium halide by-product in a separate liquid phase, d) further allowing a sufficient dwell time in the centrifugal device to provide for at least a partial condensation of the aminosilane and silazane intermediates to a degree of polymerization where the resulting, oligomeric or polymeric silazanes are less polar and denser than the ammonium halide-anhydrous liquid ammonia by-product solution and can remain separated from the by-product ammonium halide-anhydrous, liquid ammonia solution at ambient temperatures and pressures, and e) subsequently collecting the separate phases of 1) oligomeric silazane and polymeric silazane product, and 2) the by-product solution of ammonium halide in anhydrous, liquid ammonia that exit the centrifugal device through separate exit ports.

In the current process, the inertial separation of the aminosilane ammonolysis products formed in the initial course of the reaction from the by-product ammonia-ammonium c halide solution is caused to happen at times far less than those that would be required for the solubilized and ionized ammonium chloride to catalyze and substantially crosslink any Si—H containing silazane species being formed, and thereby reduce the number of Si—H bonds relative to the quantity of Si—H bonds that are incorporated into the novel silazane and/or polysilazane from the halosilane(s) of step (a). In the current process the aminosilanes and oligomeric silazanes that form are immediately separated from the by-product solubilized and ionized solution of ammonium halide in anhydrous liquid ammonia. Such times are preferably less than 10 minutes, more preferably less than 5 minutes, and most preferably less than 3 minutes. The resultant, linear and uncrosslinked polysilazanes of the instant invention are of high molecular weight as a result of their opportunity to self-condense in a liquid environment consisting essentially of only aminosilanes and oligomeric silazanes, and these resultant polysilazanes have a low ratio of cyclic to linear polymer segments because the high ammonolysis product concentration (essentially 100%) in the dense aminosilane and oligomeric silazane phase predisposes intermolecular condensation over intramolecular cyclization.

Ammonia can be recovered from the by-product solution of ammonium halide dissolved in anhydrous, liquid ammonia and recycled for further use in producing additional polysilazane through a variety of techniques that are known in the art.

For instance, the by-product solution of ammonium chloride dissolved in anhydrous, liquid ammonia can be subjected to an evaporative technique whereby the liquid ammonia is volatilized, sent to a condenser or, sequentially, to a compressor and then a condenser and recovered as liquid ammonia. The ammonium chloride salt is recovered as a solid powder.

Figure 3:
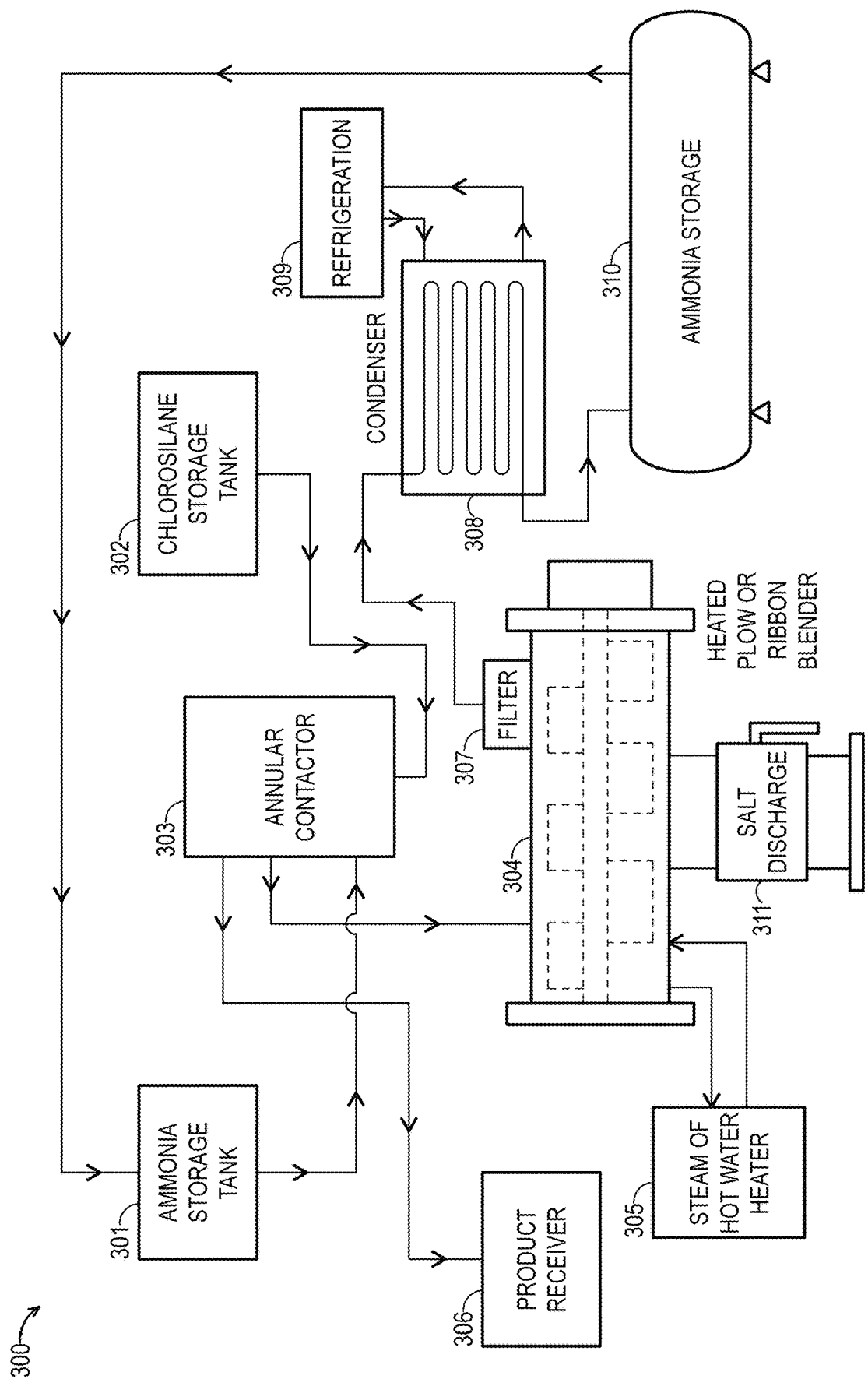
FIG. 3 shows an ammonia recovery process utilizing a simple evaporation method using a plow or ribbon blender.

This can be effected, for instance, through the use of a paddle blender or a ribbon blender with a jacketed heating mantle such as an those manufactured and sold by American Process Systems. In such a system, the ammonium chloride-anhydrous, liquid ammonia waste stream from manufacturing a polysilazane by a liquid ammonia process is collected inside the paddle blender. Paddle blending is then initiated and the paddle blender heated to a temperature sufficient to volatilize the anhydrous, liquid ammonia, which then passes to a condenser as shown in FIG. 3. The condensed liquid ammonia can be stored for future use or immediately sent back to the start of the polysilazane manufacturing process to manufacture additional polysilazane. Such a process is taught in U.S. Pat. No. 6,329,487.

FIG. 3 depicts, in detail, a Schematic for a Plant Design 300 which is representative of a process in which the by-product ammonium halide-anhydrous, liquid ammonia is recovered using a Heated Plow or Ribbon Blender. While representative of one such process, it should be understood that many variations of such a process would be apparent to one skilled in the art. In the process shown, a stoichiometric excess of anhydrous, liquid ammonia (e.g. 10× the amount required for reaction with the chlorosilane that is employed) is injected from an Ammonia Storage Tank 301 simultaneously with a stream of chlorosilane from a Chlorosilane Storage Tank 302 into an Annular Contactor 303. The anhydrous, liquid ammonia and chlorosilane react in the Annular Contactor 303 to produce product polysilazane, which is continuously separated from its ammonium halide-anhydrous, liquid ammonia by-product within the Annular Contactor 303. Two exit streams are provided from the Annular Contactor 303. The first constitutes the "light phase", which is the ammonium halid-anhydrous, liquid ammonia phase that exits at the lower exit port from the Annular Contactor 303 and is sent to a Heated Plow or Ribbon Blender 304, wherein heating is provided by a Steam or Hot Water Heater 305. The second phase constitutes the "heavy phase", which is the product polysilazane phase that exits at the upper exit port from the Annular Contactor 303 and is sent to a Product Receiver Tank 306. Operation of the Heated Plow or Ribbon Blender 304 results in the evaporation of the anhydrous, liquid ammonia from the Heated Plow or Ribbon Blender 304, which exits through a Filter 307 to remove any ammonium chloride which may be swept upward with the gaseous ammonia, and the gaseous ammonia is conducted to a Condenser 308 where it is condensed back to anhydrous, liquid ammonia through chilling by Refrigeration unit 309. The resulting anhydrous, liquid ammonia is sent to an Ammonia Storage Tank 310, after which it can be pumped back to the Ammonia Storage Tank 301 for use, again, at the front end of the process. The ammonium chloride salt that is collected in the Heated Plow or Ribbon Blender 304 is discharged from the bottom of the vessel after all of the anhydrous, liquid ammonia has been evaporated and recovered in a Salt Discharge Tank 311, which completes the production process.

Figure 4:
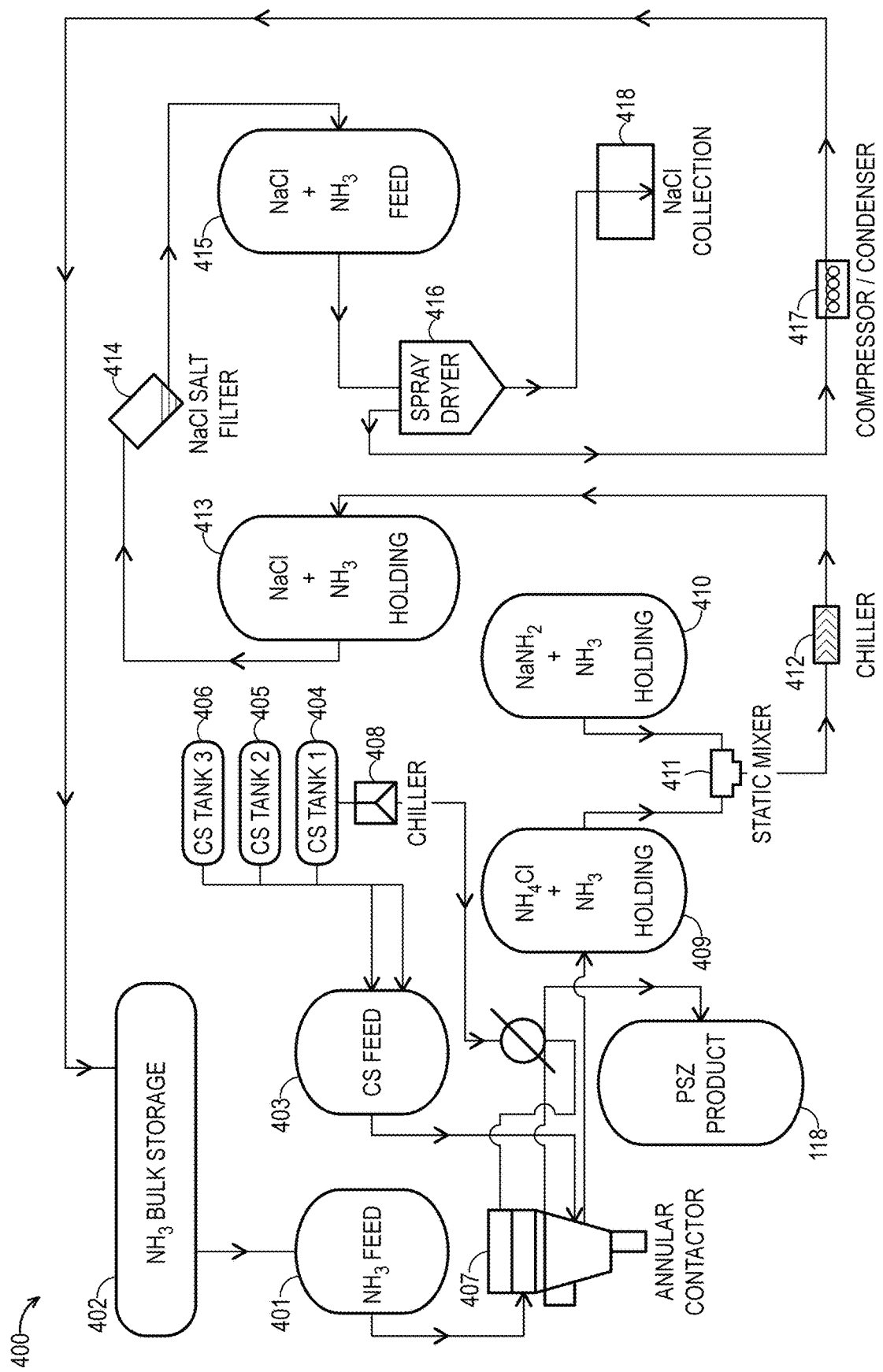
FIG. 4 shows an ammonia recovery process using a sodium amide conversion process and a spray dryer.

A reactive method involves the addition of an amide of an alkali or alkaline metal to the by-product solution of ammonium halide before ammonia evaporation. This results in the formation of a mixture of anhydrous, liquid ammonia, and the alkali or alkaline metal halide salt as shown below. The metal halide salt can then be removed from the product mixture by a simple filtration process without the problems of filter clogging that are often encountered when ammonium halide precipitate is being filtered in the presence of ammonia or polysilazane. The anhydrous, liquid ammonia can then be sent to storage or sent to the start of the polysilazane manufacturing process to prepare additional polysilazane. Alternatively, the ammonia can be evaporated from the anhydrous ammonia/alkali metal salt solution through the use of a paddle or ribbon blender or a non-aqueous spray drying technique wherein the anhydrous ammonia-ammonium halide solution is injected at the top of the spray-dryer as shown in FIG. 4. In the process shown below, ammonium chloride is first converted to sodium chloride through reaction with sodium amide ("sodamide") before sending the sodium chloride-anhydrous, liquid ammonia mixture to the spray dryer.

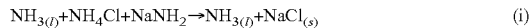

$$NH_{3(l)} + NH_4Cl + NaNH_2 \rightarrow NH_{3(l)} + NaCl_{(s)} \quad (i)$$

FIG. 4 depicts, in detail, a Schematic for a Plant Design 400 which is representative of a process that employs the reactive process above utilizing sodium amide. While representative of one such process, it should be understood that many variations of such a process would be apparent to one skilled in the art. In the process shown, a stoichiometric excess of anhydrous, liquid ammonia (e.g. 10× the amount required for reaction with the chlorosilane that is employed) is injected from an Ammonia Feed Tank 401, which is supplied with anhydrous, liquid ammonia from an Ammonia Bulk Storage Tank 402, simultaneously with a stream of chlorosilane from a Chlorosilane Feed Tank 403, which has been supplied with a mixture of three different chlorosilanes from three separate storage tanks, CS Tank 1 404, CS Tank 2 405, and CS Tank 3 406, into an Annular Contactor 407 which is cooled by a Chiller 408. The anhydrous, liquid ammonia and chlorosilane react in the Annular Contactor 407 to produce product polysilazane, which is continuously separated from its ammonium chloride-anhydrous, liquid ammonia by-product within the Annular Contactor 407. Two exit streams are provided from the Annular Contactor 407 for the two liquid phases that are produced. The first phase constitutes the "light phase," which is the ammonium chloride-anhydrous, liquid ammonia phase that exits at the lower exit port from the Annular Contactor 407 and is sent to an Ammonium Halide-Anhydrous, Liquid Ammonia Holding Tank 409. Ammonium chloride-anhydrous, liquid ammonia from the Ammonium Chloride-Anhydrous, Liquid Ammonia Holding Tank 409 is then reacted with sodium amide by sending a stream of the ammonium halide-anhydrous, liquid ammonia through a Static Mixer 411 concurrently with a stream of sodium amide-anhydrous, liquid ammonia, from a Sodium Amide-Anhydrous, Liquid Ammonia Feed Tank 410. The reaction stream is subsequently sent through a Chiller 412 to a Sodium Chloride-Anhydrous, Liquid Ammonia Holding Tank 413. From there, the sodium chloride-anhydrous, liquid ammonia reaction mixture, which constitutes a precipitate of sodium chloride in anhydrous, liquid ammonia, is sent through a Bulk Salt Filter 414 to remove any large agglomerates of sodium chloride and then to a Sodium Chloride-Anhydrous Liquid Ammonia Feed Tank 415. From the feed tank, that solution is then introduced into a Spray Dryer 416 wherein the anhydrous, liquid ammonia in the reaction mixture is evaporated, sent through a Compressor/Condenser configuration 417, and returned to the Ammonia Bulk Storage Tank 402 at the start of the process. The dry, sodium chloride salt that is collected at the bottom of the spray dryer is removed to a Sodium Chloride Collection Tank 418 for waste disposal. The second phase constitutes the "heavy phase," which is sent directly from the Annular Contactor 407 to the Polysilazane Product Tank 118.

Alternatively, the by-product solution of ammonium halide dissolved in anhydrous, liquid ammonia can be subjected to a recovery process such as that disclosed by Knasiak [G. Knasiak, "Ammonia Recovery in the Preparation of Silazanes and Polysilazanes, U.S. Pat. No. 7,033,562 (Apr. 25, 2006)] wherein water is added to the ammonium chloride-anhydrous, liquid ammonia by-product to form an aqueous solution of ammonium hydroxide and ammonium chloride as shown in the equation below, and the ammonium hydroxide is then subjected to an evaporative process to dissociate the ammonia from the ammonium hydroxide to gaseous ammonia (that can be recondensed to anhydrous, liquid ammonia), and water:

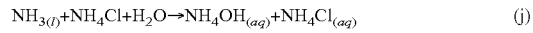

$$NH_{3(l)} + NH_4Cl + H_2O \rightarrow NH_4OH_{(aq)} + NH_4Cl_{(aq)} \quad (j)$$

$$NH_4OH_{(aq)} \rightarrow NH_{3(g)} + H_2O_{(l)} \quad (k)$$

In a variant of the above process, a basic, aqueous solution can be used to convert the resulting ammonium chloride to, for instance, an alkali metal chloride such as sodium chloride:

$$NH_{3(l)} + NH_4Cl + NaOH_{(aq)} \rightarrow NH_4OH(aq) + NaCl_{(aq)} \quad (l)$$

$$NH_4OH_{(aq)} \rightarrow NH_{3(g)} + H_2O_{(l)} \quad (m)$$

Figure 5:
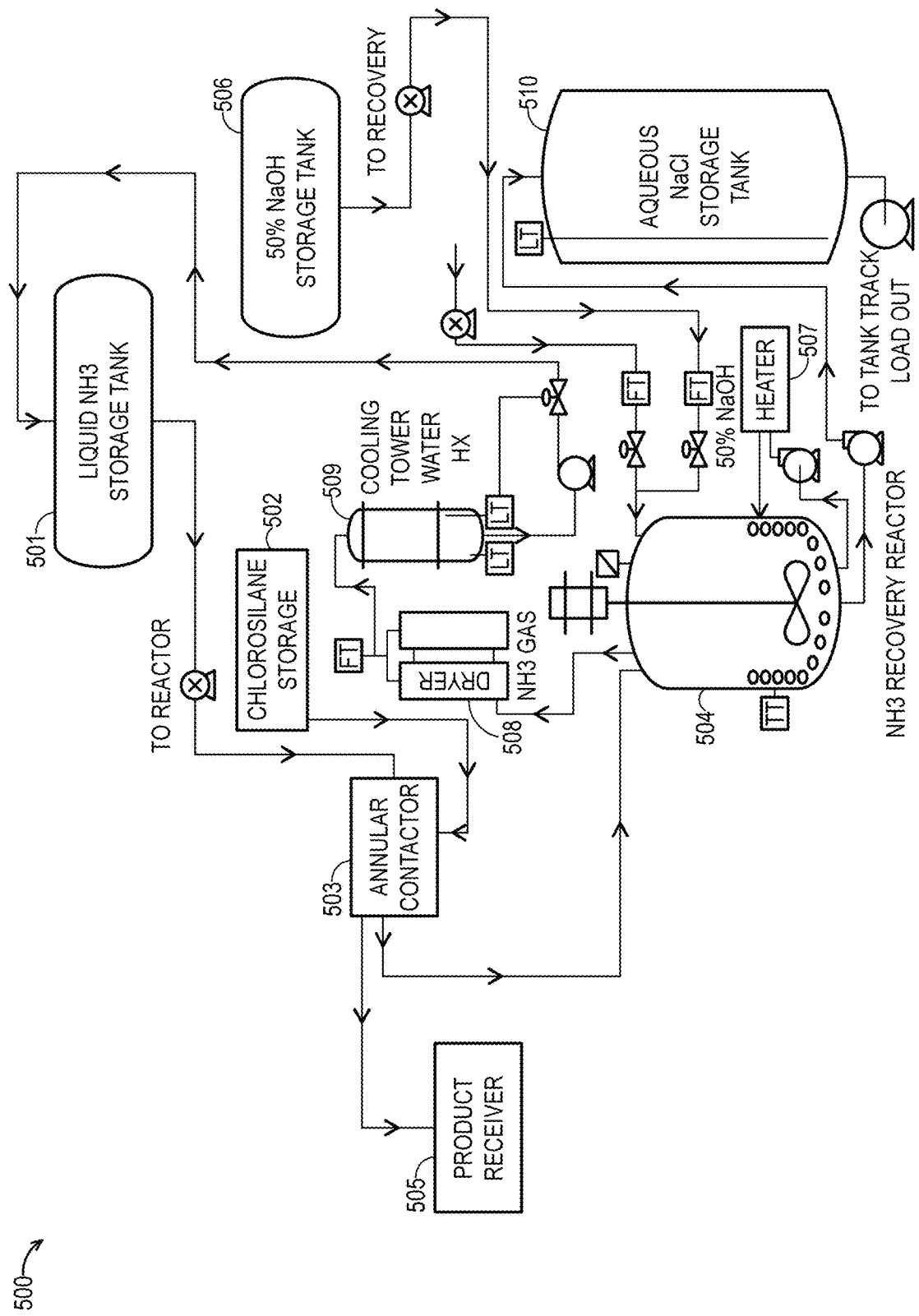
FIG. 5 shows an ammonia recovery process utilizing an evaporative, aqueous ammonium hydroxide method.

Such a process is shown in FIG. 5 wherein an ammonium chloride-anhydrous, liquid ammonia waste stream is sent to an ammonia recovery reactor. Aqueous sodium hydroxide solution is then added to effect full conversion of the ammonium chloride to ammonium hydroxide and sodium chloride. The ammonia recovery reactor is then heated to evaporate "wet" ammonia gas that is then sent through a dryer to a cooling tower, where it condenses to an anhydrous liquid. The resulting anhydrous, liquid ammonia is then sent to a storage tank or to the start of the polysilazane manufacturing process where it is used to, again, prepare additional polysilazane.

FIG. 5 depicts, in detail, a Schematic for a Plant Design 500 that is representative of a process that employs the reactive process above utilizing water that is introduced into the ammonium chloride-anhydrous, liquid ammonia by-product using a solution of aqueous, sodium hydroxide. While representative of one such process, it should be understood that many variations of such a process would be apparent to one skilled in the art. In the process shown, a stoichiometric excess of anhydrous, liquid ammonia (e.g. 10× the amount required for reaction with the chlorosilane that is employed) is injected from a Liquid Ammonia Storage Tank 501 simultaneously with a stream of chlorosilane from a Chlorosilane Storage Tank 502 into an Annular Contactor 503. The anhydrous, liquid ammonia and chlorosilane react in the Annular Contactor 503 to produce product polysilazane, which is continuously separated from its ammonium chloride-anhydrous, liquid ammonia by-product within the Annular Contactor 503. Two exit streams are provided from the Annular Contactor 503. The first constitutes the "light phase", which is the ammonium chloride-anhydrous, liquid ammonia phase that exits at the lower exit port from the Annular Contactor 503 and is sent to an Ammonia Recovery Reactor 504. The second phase constitutes the "heavy phase" polysilazane product that exits at the upper exit port from the Annular Contactor 503 and is sent to a Product Receiver Tank 505. Aqueous sodium hydroxide solution is then provided to the Ammonia Recovery Reactor 504 from an Aqueous Sodium Hydroxide Storage Tank 506, at which point the ammonium halide-anhydrous, liquid ammonia in the Ammonia Recovery Reactor 504 reacts with the sodium hydroxide that is introduced to form an aqueous solution of ammonium hydroxide and sodium chloride. The Ammonia Recovery Reactor 504 is then heated using Heater 507, and the aqueous ammonium hydroxide present in the Ammonia Recovery Reactor 504 disproportionates into water and ammonia gas. The evaporating ammonia gas is sent, first, through a Dryer Assembly 508 and then through a water-cooled Cooling Tower 509, where it is condensed to anhydrous, liquid ammonia and subsequently sent back to the Liquid Ammonia Storage Tank 501, at which point it can be used at the front end of the process. The aqueous solution of sodium chloride that remains in the Ammonia Recovery Reactor 504 once all of the ammonia has been recovered, is then sent to an Aqueous Sodium Chloride Storage Tank 510 for waste disposal.

In similar fashion, aqueous calcium hydroxide can be first added to the by-product solution of ammonium halide in anhydrous liquid ammonia to convert the ammonium chloride to calcium chloride, such as practiced in the Solvay process for the preparation of calcium carbonate. In this process, aqueous ammonium hydroxide and aqueous calcium chloride are generated as shown below. The ammonium hydroxide composition can then be subjected to an evaporative process such as described in U.S. Pat. No. 7,033,562, above, to dissociate the ammonia from the ammonium hydroxide to regenerate gaseous ammonia (that can be recondensed to anhydrous, liquid ammonia), and an solution of aqueous calcium chloride.

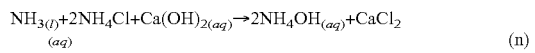

$$NH_{3(l)} + 2NH_4Cl + Ca(OH)_{2(aq)} \rightarrow 2NH_4OH_{(aq)} + CaCl_{2(aq)} \quad (n)$$

$$NH_4OH_{(aq)} \rightarrow NH_{3(g)} + H_2O \quad (o)$$

Figure 6:
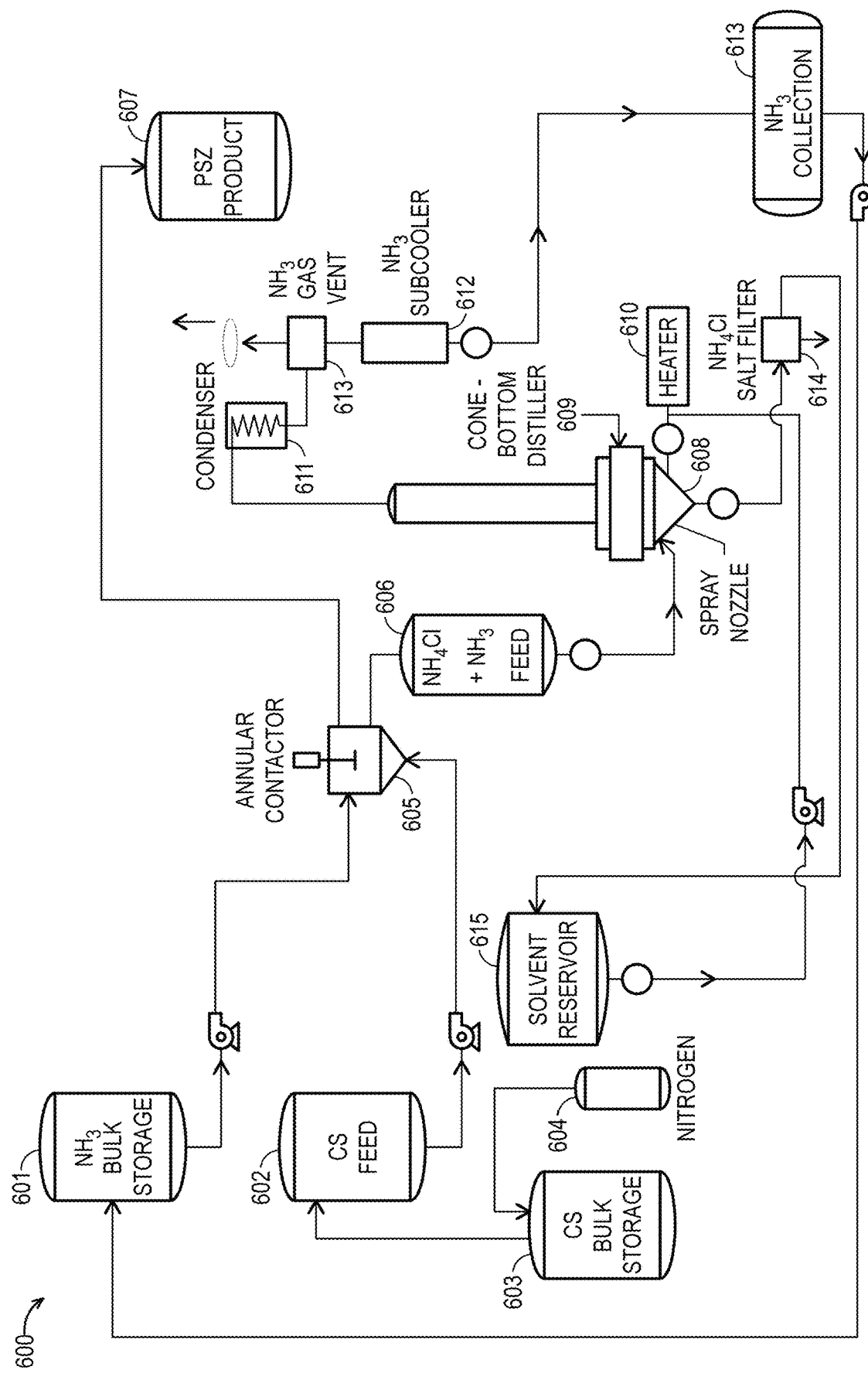
FIG. 6 shows an ammonia recovery process utilizing a cone-bottom distiller to effect ammonia evaporation.

Notwithstanding the above methods to treat the anhydrous, liquid ammonia-ammonium halide waste from a liquid ammonia manufacturing process for polysilazane, a preferred unit recovery process for the waste stream of ammonium halide-anhydrous, liquid ammonia is one that utilizes a cone-bottom distiller as taught by Stowe et al [S. C. Stowe and E. K. Morris, "Recovery of Ammonium Chloride from Solution in Liquid Ammonia", U.S. Pat. No. 2,541,724 (Feb. 13, 1951)]. When used to recover the ammonia from the manufacture of polysilazane as described above, this process provides for a fully continuous operation. Such a process is integral to the continuous nature of the instant invention and is shown in FIG. 6. In this process, the solution of anhydrous, liquid ammonia and ammonium halide is continuously spray-injected directly into a reservoir of an organic or inorganic solvent in which the ammonium halide is not soluble. This process is done at slightly elevated temperatures, from about 40 deg-C. to about 50 deg-C., at which temperatures anhydrous, liquid ammonia readily evaporates. Since the ammonium halide contained in solution is not soluble in the solvent into which the solution is injected, it immediately crystallizes and precipitates from solution. At this point it can be readily filtered from the solvent without the complication that arises from filter clogging in the presence of residual ammonia that adheres to ammonium halide precipitate. The evaporating ammonia is conducted to a condenser or a compressor/condenser assembly in which it is converted, again, to an anhydrous liquid. The resulting, anhydrous, liquid ammonia can then be recycled to the front end of the process to produce more polysilazane. A continuous "loop" of recycled ammonia is thus established. If the speed at which each of the unit operations is tailored to the production rate of polysilazane in the centrifugal device, a wholly continuous manufacturing process is established.

A process flow diagram for a manufacturing facility that produces polysilazane and incorporates the inventive concepts described above is shown in FIG. 6. In the process, anhydrous, liquid ammonia and chlorosilane reactant are flowed continuously from an Ammonia Feed Tank into a Centrifugal Reactor wherein 1) Mixing, 2) Reaction, 3) Cooling, and 4) Separation is accomplished. The Polysilazane product is then sent to a Product Collection Tank while the anhydrous, liquid ammonia-ammonium chloride by-product solution is sent to a holding tank. The anhydrous, liquid ammonia-ammonium chloride by-product solution is subsequently sent through a spray nozzle that injects the solution directly into a heated reservoir of high-boiling organic or inorganic solvent where the ammonium chloride immediately crystallizes and precipitates from solution. The liquid ammonia that is injected concurrently vaporizes and is sent to a condenser and then a bulk storage tank for reuse at the start of the manufacturing process to produce additional polysilazane.

FIG. 6 depicts, in detail, a Schematic for a Plant Design 600 which is representative of a process in which the by-product ammonium chloride-anhydrous, liquid ammonia is recovered using a Cone Bottom Distiller. While representative of one such process, it should be understood that many variations of such a process would be apparent to one skilled in the art. In the process shown, a stoichiometric excess of anhydrous, liquid ammonia (e.g. 10× the amount required for reaction with the chlorosilane that is employed) is injected from an Ammonia Bulk Storage Tank 601 simultaneously with a stream of chlorosilane from a Chlorosilane Feed Tank 602, which is supplied with chlorosilane from a Chlorosilane Bulk Storage Tank 603 by pressurization with Nitrogen 604, into an Annular Contactor 605. The anhydrous, liquid ammonia and chlorosilane react in the Annular Contactor 605 to produce product polysilazane, which is continuously separated from its ammonium chloride-anhydrous, liquid ammonia by-product within the Annular Contactor 605. Two exit streams are provided from the Annular Contactor 605. The first constitutes the "light phase", which is the ammonium chloride-anhydrous, liquid ammonia phase that exits at the lower exit port from the Annular Contactor 605 and is sent to an Ammonium Chloride-Anhydrous, Liquid Ammonia Feed Tank 606. The second phase, the "heavy phase" which exits through the upper port of the Annular Contactor 605, constitutes the polysilazne product, which is sent to the Polysilazane Product Tank 607. The ammonium chloride-anhydrous, liquid ammonia by-product in the Ammonium Chloride-Anhydrous, Liquid Ammonia Feed Tank 606 is then injected, through a Spray Nozzle 608 into a reservoir of non-reactive solvent that is present at the bottom of a Cone Bottom Distiller 609 that is heated using Heater 610 to evaporate the ammonia from the ammonium chloride-anhydrous, liquid ammonia by-product. The evaporating ammonia is then sent to a Condenser 611 to condense it to anhydrous, liquid ammonia, and the anhydrous, liquid ammonia is then sent to an Ammonia Sub-Cooler 612, by way of an Ammonia Gas Vent 613 that eliminates any residual ammonia gas present in the stream. From the Ammonia Subcooler 612 the anhydrous, liquid ammonia is then sent to an Ammonia Collection Tank 613 from which it can be subsequently supplied to the Ammonia Bulk Storage Tank 601 at the start of the process. The precipitated ammonium chloride salt-solvent mixture at the bottom of the Cone Bottom Distiller 609 can then be sent through an Ammonium Chloride Filter 614 and collected as a solid for waste disposal. The solvent that passes through the Ammonium Chloride Filter 614 is sent to a Solvent Reservoir Tank 615 from which it can be used to recharge the solvent reservoir at the bottom of the Cone Bottom Distiller 609.

Figure 7:
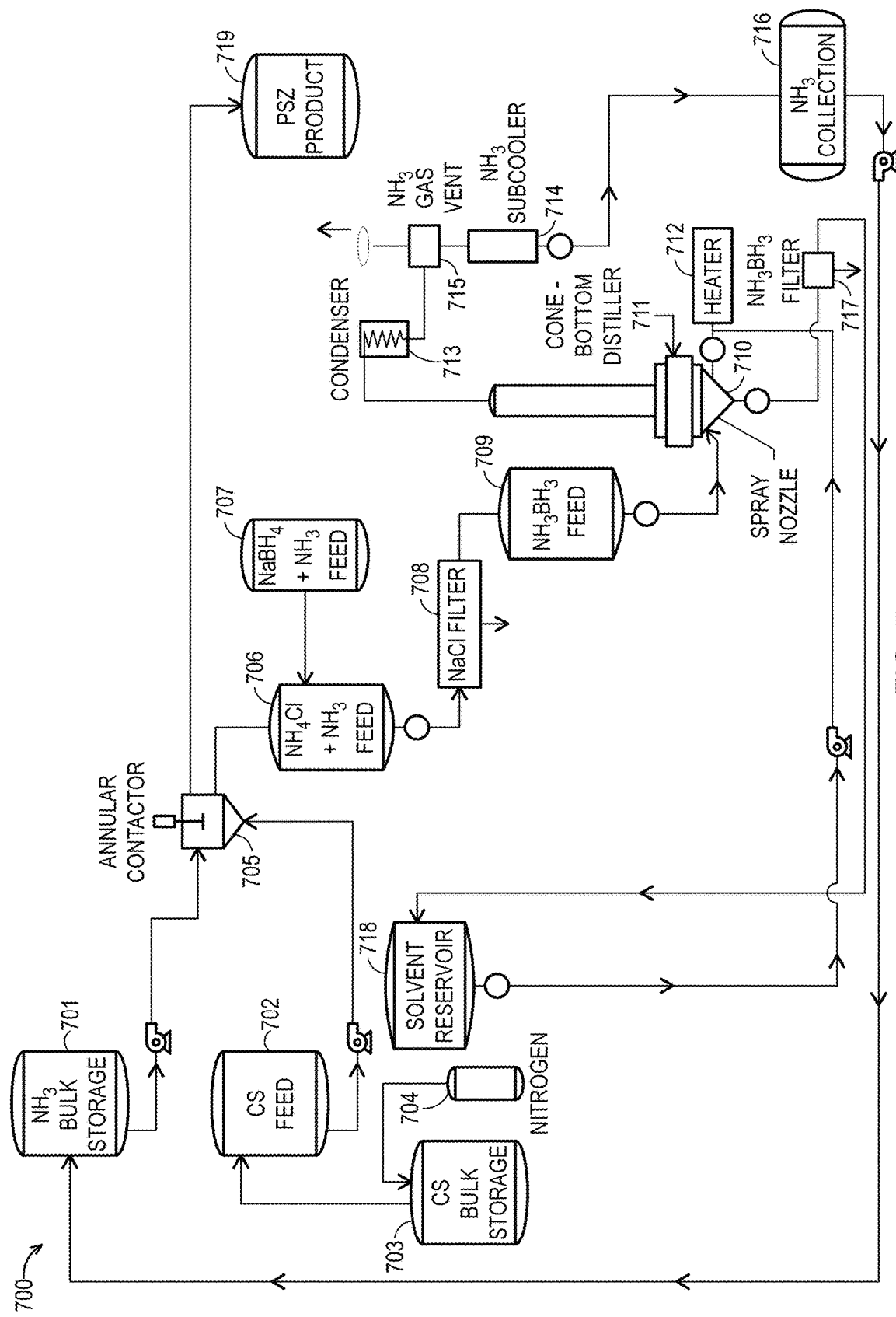
FIG. 7 shows an ammonia recovery process using an ammonia borane conversion process and a cone-bottom distiller.

A particularly preferred reactive process to recover ammonia from the anhydrous ammonia-ammonium chloride solution, and an additional object of this invention, involves the direct conversion of the ammonium halide in the anhydrous, liquid ammonia solution waste stream to ammonia borane. This process is shown in FIG. 7. In this highly preferred process, a high value-added solid useful in hydrogen storage applications is formed through the process of reacting the by-product solution of ammonium halide in anhydrous, liquid ammonia with sodium borohydride as taught by Autrey [S. T. Autrey, D. J. Heldebrant, J. C. Linehan, A. J. Karkamkar, and F. Zheng, U.S. Pat. No. 7,897,129 (Mar. 1, 2011)]:

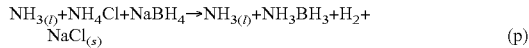

$$NH_{3(l)}+NH_4Cl+NaBH_4 \rightarrow NH_{3(l)}+NH_3BH_3+H_2+NaCl_{(s)}$$ (p)

In such a reactive process the problem of separating ammonium halide from anhydrous, liquid ammonia is again solved through the generation of a metal halide salt that is not soluble in the anhydrous, liquid ammonia and which can be immediately filtered from solution from the anhydrous, liquid ammonia. However, in this case the reaction of the solubilized ammonium halide with sodium borohydride forms ammonia borane, a high value-added hydrogen storage material.

The ammonia borane that remains in solution with the anhydrous ammonia can then be advantageously recovered through the use of a cone-bottom distillation apparatus as described above, utilizing an organic solvent in which the ammonia borane is not soluble. Examples of such solvents are higher-boiling, non-polar organic solvents such as dodecane, and higher-boiling, non-polar inorganic solvents such as decamethylcyclopentasiloxane ("D5") or dodecamethylcyclohexasiloxane ("D6"). Again, as above, if the speed at which each of the unit operations is tailored to the production rate of polysilazane in the centrifugal device, a wholly continuous manufacturing process is established.

A process flow diagram for a manufacturing facility that produces both polysilazane and ammonia borane and incorporates the inventive concepts described above is shown in FIG. 7. Similar to the process described immediately above, anhydrous, liquid ammonia and chlorosilane reactant are flowed continuously from an Ammonia Feed Tank into a Centrifugal Reactor wherein 1) Mixing, 2) Reaction, 3) Cooling, and 4) Separation is accomplished. The Polysilazane product is then sent to a Product Collection Tank while the anhydrous, liquid ammonia-ammonium chloride by-product solution is sent to a holding tank, at which point solid sodium borohydride is added, resulting in an immediate reaction which generates both ammonia borane and sodium chloride. While the ammonia borane remains in solution with the anhydrous, liquid ammonia, the sodium chloride immediately precipitates from solution and is filtered out on passing the solution of ammonia borane and anhydrous, liquid ammonia through a filter to another holding tank. That solution is then injected through a spray nozzle that injects the solution directly into a heated reservoir of high-boiling organic or inorganic solvent in which the ammonia borane is not soluble, at which point the ammonia borane immediately crystallizes and precipitates from solution. The liquid ammonia that is injected concurrently vaporizes and is sent to a condenser and then a bulk storage tank for reuse at the start of the manufacturing process to manufacture polysilazane to produce additional polysilazane.

FIG. 7 depicts, in detail, the preferred embodiment of the invention, which is Schematic for a Plant Design 700 which is representative of a process in which by-product ammonium chloride-anhydrous, liquid ammonia is reacted with sodium borohdride to produce ammonia borane. While representative of one such process, it should be understood that many variations of such a process would be apparent to one skilled in the art. In the process shown, a stoichiometric excess of anhydrous, liquid ammonia (e.g. 10× the amount required for reaction with the chlorosilane that is employed) is injected from an Ammonia Bulk Storage Tank 701 simultaneously with a stream of chlorosilane from a Chlorosilane Feed Tank 702 [which is supplied with chlorosilane from a Chlorosilane Bulk Storage Tank 703 by pressurization with Nitrogen 704] into an Annular Contactor 705. The anhydrous, liquid ammonia and chlorosilane react in the Annular Contactor 705 to produce product polysilazane, which is continuously separated from the ammonium chloride-anhydrous, liquid ammonia by-product within the Annular Contactor 705. Two exit streams are provided from the Annular Contactor 705. The first constitutes the "light phase", which is the ammonium chloride-anhydrous, liquid ammonia phase that exits at the lower exit port from the Annular Contactor 705 and which is sent to an Ammonium Chloride-Anhydrous, Liquid Ammonia Feed Tank 706. A stream of a solution of sodium borohydride in anhydrous, liquid ammonia from a Sodium Borohydride-Anhydrous, Liquid Ammonia Feed Tank 707 is then injected into the Ammonium Chloride-Anhydrous Liquid Ammonia Feed Tank 706 to react with the ammonium chloride in the by-product to form a mixture of a solution of ammonia borane in anhydrous, liquid ammonia and precipitated sodium chloride, while venting the hydrogen gas that is formed. That mixture is then sent through a Filter 708 to remove the precipitated sodium chloride, which is collected and sent to waste. The resulting solution of ammonia borane in anhydrous, liquid ammonia is sent to an Ammonia Borane-Anhydrous, Liquid Ammonia Feed Tank 709. From the Ammonia Borane-Anhydrous, Liquid Ammonia Feed Tank 709 the solution of ammonia borane in anhydrous, liquid ammonia is injected through a Spray Nozzle 710 into a reservoir of non-reactive solvent that is present at the bottom of a Cone Bottom Distiller 711 that is heated using Heater 712 to evaporate the ammonia from the ammonium halide-anhydrous, liquid ammonia by-product. The evaporating ammonia is sent to a Condenser 713 to condense it to anhydrous, liquid ammonia, and the anhydrous, liquid ammonia is then sent to an Ammonia Sub-Cooler 714, by way of an Ammonia Gas Vent 715 that eliminates any residual ammonia gas present in the stream. From the Ammonia Subcooler 714 the anhydrous, liquid ammonia is then sent to an Ammonia Collection Tank 716 from which it can be subsequently re-supplied to the Ammonia Bulk Storage Tank 701 at the start of the process. The precipitated ammonia borane and solvent mixture at the bottom of the Cone Bottom Distiller 711 is then sent through an Ammonia Borane Filter 717 and collected as the second product of the process. The solvent that is passed through the Ammonia Borane Filter 717 is sent to a Solvent Reservoir Tank from which it can be used to further recharge the solvent reservoir at the bottom of the Cone Bottom Distiller 711. The second phase, which constitutes the "heavy phase" polysilazane product that exits at the upper exit port of the Annular Contactor 705 is sent to a Product Receiver Tank 719.

Most preferred is a process that not only utilizes the anhydrous ammonia-ammonium halide waste product from the manufacture of polysilazane to generate ammonia borane through reaction with sodium borohydride, but also utilizes that waste stream to regenerate ammonia borane from ammonium tetramethoxyborate, which is the spent "waste product" from the generation of hydrogen gas from ammonia borane when hydrogen gas is generated through a methanolysis process. The reaction, shown in FIG. 8, involves adding the ammonium tetramethoxyborate and an alkali metal hydride, such as lithium aluminum hydride or sodium hydride, to the anhydrous ammonium/ammonium chloride solution, at which point ammonia borane is regenerated from the ammonium tetramethoxyborate:

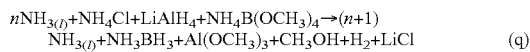
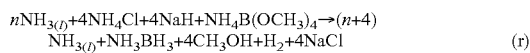

Figure 8:
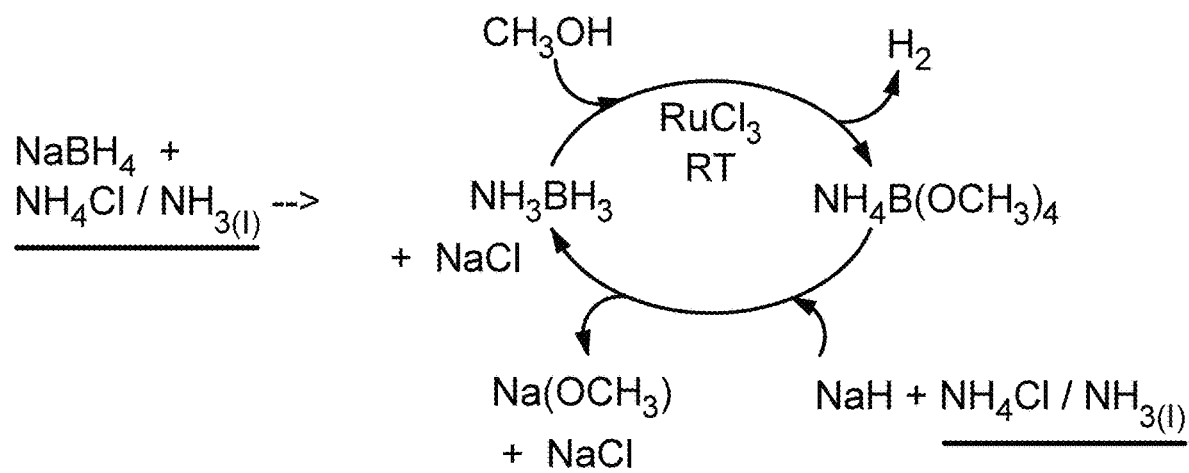
FIG. 8 shows an ammonia borane reaction cycle using ammonium chloride/anhydrous, liquid ammonia as a raw material feedstock for the generation of ammonia borane as well as the re-generation of ammonia borane from "spent" ammonia borane.

Describing the process depicted in FIG. 8 in detail, a solution of ammonium chloride and sodium hydride in anhydrous, liquid ammonia, using the by-product of polysilazane manufacturing, is first reacted with ammonium tetramethoxyborate [which is the chemical "waste" product from the production of hydrogen from ammonia borane using a methanolysis route involving a ruthenium chloride catalyst]. The reaction results in the production of ammonia borane with by-product sodium methoxide and sodium chloride. The ammonia borane produced can then be further supplemented with "fresh" material through the reaction of a solution of ammonium chloride by-product, again from the polysilazane manufacturing processes described above, with sodium borohydride to generate additional ammonia borane that can be used for hydrogen production through methanolysis in the presence of ruthenium chloride catalyst.

Applicants reserve the right to submit claims directed to combinations and sub combinations of the disclosed inventions that are believed to be novel and non-obvious. Inventions embodied in other combinations and sub combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A process to manufacture a silazane or polysilazane comprising the steps of:
    (a) contacting a flowing stream of halosilane with a flowing stream of anhydrous, liquid ammonia in the chamber of an operating centrifugal device, where said centrifugal device is capable of inertially separating a product stream of aminosilane and silazane ammonolysis intermediates of slightly different densities and polarities from a stream of anhydrous, liquid ammonia-ammonium halide by- product, using a centrifugal force of sufficient magnitude to effect such separation;
    (b) allowing a dwell time in the centrifugal device sufficient to fully provide for the reaction of the halosilane reactant with the anhydrous, liquid ammonia to form polar, aminosilanes and silazanes that are soluble in the anhydrous liquid ammonia;
    (c) further allowing a sufficient dwell time in the centrifugal device to allow for the separation of these aminosilane and silazane intermediates from the anhydrous, liquid ammonia-ammonium halide by-product in a separate liquid phase;
    (d) further allowing a sufficient dwell time In the centrifugal device to provide for at least a partial condensation of the aminosilane and silazane intermediates to a degree of polymerization where the resulting, oligomeric or polymeric silazanes are less polar and denser than the ammonium halide-anhydrous liquid ammonia by-product solution and remain separated from the by-product ammonium halide-anhydrous, liquid ammonia solution at ambient temperatures and pressures, and;
    (e) subsequently collecting the separate phases of (1) oligomeric silazane and polymeric silazane product, and (11) the by-product solution of ammonium halide in anhydrous, liquid ammonia that exit the centrifugal device through separate exit ports.

2. The process of claim 1 wherein the centrifugal device is an annular contactor.

3. The process of claim 1 wherein the by-product solution of ammonium halide in anhydrous, liquid ammonia is subsequently treated with an alkali metal amide salt to convert the ammonium halide to a precipitated alkali halide salt in anhydrous liquid ammonia.

4. The process of claim 3 wherein said alkali metal is sodium or potassium.

5. The process of claim 4 where the alkali metal is sodium metal.

6. The process of claim 3 wherein the precipitated alkali halide salt is subsequently removed from the anhydrous, liquid ammonia and the anhydrous, liquid ammonia that is recovered is returned to step a.

7. The process of claim 1 wherein the by-product ammonium halide is ammonium chloride and the ammonium chloride-liquid anhydrous ammonia solution is treated with sodium borohydride converting the solution of ammonium chloride in anhydrous liquid ammonia to a solution of ammonia borane in anhydrous liquid ammonia and a precipitated sodium chloride salt.

8. The process of claim 7 wherein the precipitated sodium chloride salt is subsequently removed from the solution of ammonia borane in anhydrous liquid ammonia by a filtration step, where the anhydrous, liquid ammonia that is recovered after removal of ammonia borane is returned to step a.

9. The process of claim 8 wherein the ammonia borane is removed from the solution of ammonia borane in anhydrous liquid ammonia by injecting said solution into a heated reservoir of an organic or inorganic solvent in which the ammonia borane is insoluble, causing it to precipitate from solution.

10. The process of claim 9 wherein said heated reservoir of an organic or inorganic solvent in which the ammonia borane is insoluble is heated to a temperature at which the anhydrous liquid ammonia component of the solution vaporizes and is subsequently recovered through condensation to a liquid and returned to step a.

11. The process of claim 1 wherein the by-product ammonium halide is ammonium chloride and the solution of ammonium chloride in anhydrous liquid ammonia is treated with an alkali metal hydride and ammonium tetramethylborate converting the ammonium chloride to ammonia borane and the alkali metal hydride to an alkali metal chloride salt.

12. The process of claim 9 wherein sodium chloride salt, ammonia borane, and organic solvent are removed from the anhydrous, liquid ammonia and the anhydrous liquid ammonia that is recovered is returned to step a.

13. The process of claim 6 wherein the rates of steps a), b), c), d), e) and the subsequent rate of the step of ammonia recovery are all equivalent, and the recovered ammonia is returned to step a.

14. The process of claim 10 wherein the rates of steps a), b), c), d), e) and the subsequent rate of the step of ammonia recovery are all equivalent, and the recovered ammonia is returned to step a.

15. The process of claim 12 wherein the rates of steps a), b), c), d), e) and the subsequent rate of the step of ammonia recovery are all equivalent, and the recovered ammonia is returned to step a.

* * * * *